US011884524B2

(12) United States Patent
Blosser

(10) Patent No.: US 11,884,524 B2
(45) Date of Patent: Jan. 30, 2024

(54) WINCH

(71) Applicant: FeraDyne Outdoors, LLC, Superior, WI (US)

(72) Inventor: Benjamin D. Blosser, Corydon, KY (US)

(73) Assignee: FeraDyne Outdoors, LLC, Superior, WI (US)

( * ) Notice: Subject to any disclaimer, the term of this patent is extended or adjusted under 35 U.S.C. 154(b) by 282 days.

(21) Appl. No.: 17/281,091

(22) PCT Filed: Oct. 8, 2019

(86) PCT No.: PCT/US2019/055159
§ 371 (c)(1),
(2) Date: Mar. 29, 2021

(87) PCT Pub. No.: WO2020/076802
PCT Pub. Date: Apr. 16, 2020

(65) Prior Publication Data
US 2021/0309497 A1 Oct. 7, 2021

Related U.S. Application Data

(60) Provisional application No. 62/743,203, filed on Oct. 9, 2018.

(51) Int. Cl.
*B66D 1/04* (2006.01)
*B66D 1/20* (2006.01)

(52) U.S. Cl.
CPC *B66D 1/04* (2013.01); *B66D 1/20* (2013.01)

(58) Field of Classification Search
CPC ... B66D 1/04; B66D 1/14; B66D 1/16; B66D 1/20; B66D 1/28; B66D 1/30; B66D 1/34;
(Continued)

(56) References Cited

U.S. PATENT DOCUMENTS 517,842 A * 4/1894 Cline .................... E04H 17/135
256/42
3,986,588 A 10/1976 Kuzarow
(Continued)

FOREIGN PATENT DOCUMENTS

CN 201148316 Y 11/2008
CN 202038828 U * 11/2011
(Continued)

OTHER PUBLICATIONS

David Round M-Series Compact Spur Gear Han Winches for Lifting and Pulling https://www.davidround.com/product/manual-winch/.

(Continued)

*Primary Examiner* — Michael R Mansen
*Assistant Examiner* — Henrix Soto
(74) *Attorney, Agent, or Firm* — Greenberg Traurig, LLP

(57) ABSTRACT

A non-limiting exemplary embodiment of a winch includes a bearing housing, a one way bearing having an outer ring attached to the bearing housing, a bearing hub having a cylindrical section attached to an inner ring of the one way bearing, a friction disk having a first surface adjacent a disc of the bearing hub, a crank spool having a first disk adjacent a second surface of the friction disk, a crank housing configured for rotatably retaining the crank spool, a crank shaft extending through the bearing hub, through the friction disk, and into the crank spool, wherein a first end of the crank shaft is coupled to the crank spool, and a crank mechanism coupled to a second end of the crank shaft.

29 Claims, 42 Drawing Sheets

(58) Field of Classification Search

CPC ................ B66D 1/7452; B66D 1/7468; B66D 2700/0116; B66D 2700/0183; B66D 3/02; B66D 3/14; B66D 5/34; F16D 47/04; F16D 41/064; F16D 2041/0646; F16D 13/70

USPC .......................................................... 254/368

See application file for complete search history.

(56) References Cited

U.S. PATENT DOCUMENTS

| | | | | | |
|---|---|---|---|---|---|
| 4,171,796 | A * | 10/1979 | Forbush | A63B 61/04 | 81/177.85 |
| 5,374,035 | A * | 12/1994 | Santos | F16D 49/00 | 254/323 |
| 5,573,091 | A * | 11/1996 | Hung | B66D 1/16 | 254/323 |
| 6,116,580 | A | 9/2000 | Hull | | |
| 6,431,525 | B1 | 8/2002 | Roll | | |
| 6,883,784 | B1 * | 4/2005 | Sloneker | B66D 1/04 | 254/366 |
| 7,114,705 | B2 * | 10/2006 | Steiner | B66D 1/7473 | 81/177.85 |
| 7,850,146 | B2 | 12/2010 | Kempf | | |
| 7,909,307 | B2 | 3/2011 | Kempf | | |
| 8,196,900 | B2 | 6/2012 | Kempf | | |
| 8,292,268 | B2 | 10/2012 | Kempf | | |
| 8,313,090 | B2 | 11/2012 | Kempf | | |
| 8,443,790 | B2 | 5/2013 | Pestrue | | |
| 8,695,945 | B2 * | 4/2014 | Guyard | B66D 1/14 | 254/350 |
| 9,003,992 | B2 * | 4/2015 | VanScoyoc | B63B 21/22 | 114/210 |
| 9,067,769 | B2 * | 6/2015 | Huang | B66D 1/04 | |
| 10,077,965 | B2 | 9/2018 | Yehle | | |
| 10,082,359 | B2 | 9/2018 | Yehle | | |
| 10,126,088 | B2 | 11/2018 | Yehle | | |
| 10,175,023 | B2 | 1/2019 | Yehle | | |
| 10,260,835 | B2 | 4/2019 | Pulkrabek et al. | | |
| 10,295,295 | B2 | 5/2019 | Shaffer et al. | | |
| 10,295,299 | B2 | 5/2019 | Vergara | | |
| 2009/0309080 | A1 | 12/2009 | Kempf | | |
| 2011/0101293 | A1 | 5/2011 | Kempf | | |
| 2012/0298938 | A1 | 11/2012 | Anderson et al. | | |
| 2014/0352596 | A1 | 12/2014 | VanScoyoc | | |
| 2015/0060747 | A1 | 3/2015 | Huang | | |

FOREIGN PATENT DOCUMENTS

| | | | | | |
|---|---|---|---|---|---|
| CN | 202465165 | U | * | 10/2012 | |
| CN | 203865916 | U | * | 10/2014 | |
| CN | 105398995 | A | * | 3/2016 | |
| CN | 105972201 | A | * | 9/2016 | B66D 5/06 |

OTHER PUBLICATIONS

Sprag Clutch https://en.wikipedia.org/wiki/Sprag_clutch.

Vestil Single Speed Hand Winch With Load Pressure Brake—600-Lb. Load Capacity, Model# HWG-600 https://www.northerntool.com/shop/tools/product_200670596_200670596.

Vestil Manual and Worm Gear Hand Winches https://www.vestil.com/product.php?FID=594.

* cited by examiner

WINCH

CROSS-REFERENCE TO RELATED APPLICATIONS

Pursuant to 35 U.S.C. § 371, this patent application is a U.S. National Stage patent application ("371 application") of International Patent Application No. PCT/US19/55159 filed Oct. 8, 2019, which claims the benefit of U.S. Provisional Patent Application No. 62/743,203 filed Oct. 9, 2018, which are herein incorporated by reference in their entirety.

STATEMENT REGARDING FEDERALLY SPONSORED RESEARCH OR DEVELOPMENT

Not applicable.

TECHNICAL FIELD

The instant disclosure pertains to a winch.

BACKGROUND

U.S. Pat. No. 10,295,299 to Vergara discloses a cocking mechanism comprising an actuator assembly, a hand crank assembly, and a bow string hook assembly. The actuator assembly further comprises clutch assembly having a bearing housing, a bearing cage, a support axle and bearing elements. The bearing housing is defined by an inner peripheral surface having a plurality of inwardly extending annular ramps, wherein the bearing elements contact a portion of the ramps to prevent rotation of the support axle in a first direction, but allows for rotation of the support axle in a second direction when the actuator assembly is in a locked configuration. This provides for immediate braking action against any unforeseen forward motion of the bow string of a crossbow such as when inadvertently or accidently releasing the removable hand crank assembly during the cocking operation.

U.S. Pat. No. 10,260,835 to Pulkrabek discloses a system for cocking mechanism for a crossbow that uses an elongated handle pivotally attached to the center support to move a traveler engaged with the draw string from a release configuration to a drawing configuration and into engagement with a trigger assembly. A ratcheting mechanism prevents the elongated handle from moving toward the open configuration as the crossbow is being cocked.

U.S. Pat. No. 10,175,023 to Yehle discloses a cocking system for retracting a string carrier on a crossbow that is substantially silent during operation.

U.S. Pat. No. 10,126,088 to Yehle discloses a crossbow including first and second flexible limbs attached to a center rail. A draw string extends across the center rail that translates between a released configuration and a drawn configuration. A string carrier including a catch is movable between a closed position that engages the draw string and an open position that releases the draw string. The string carrier slides along the center rail to engage with the draw string in the released configuration and slides to a retracted position that locates the draw string in the drawn configuration. A retaining mechanism retains the string carrier in the retracted position and the draw string in the drawn configuration. A trigger moves the catch from the closed position to the open position to fire the crossbow when the string carrier is in the retracted position.

U.S. Pat. No. 10,082,359 to Yehle discloses a torque control system for cocking a crossbow. The cocking mechanism includes a rotating member mounted to the center rail and coupled to a flexible tension member attached to a string carrier. A cocking handle is configured to engage with the rotating member to cock the crossbow. A torque control mechanism limits output torque applied to the rotating member such that rotating the cocking handle after the string carrier is in the retracted position does not move the draw string past the drawn configuration.

U.S. Pat. No. 10,077,965 to Yehle discloses a cocking system for a crossbow wherein string carrier slides along the center rail during movement with the draw string in the released configuration to a retracted position that locates the draw string in the drawn configuration. A trigger is positioned to move the catch from the closed position and the open position to fire the crossbow when the string carrier is in the retracted position. At least one cocking rope is configured to engage with the string carrier to retract the string carrier and the draw string to the drawn configuration. A retaining mechanism retains the string carrier in the retracted position and the draw string in the drawn configuration independent of the cocking ropes.

U.S. Pat. No. 8,443,790 to Pestrue discloses a crossbow having a bowstring cocking winch apparatus, a cocking winch apparatus usable with a crossbow, and a method of operating the apparatus are described. The cocking winch apparatus includes a projecting alignment member having a non-round cross-sectional shape, where the alignment member is removably securable to a butt portion of a crossbow stock by inserting the alignment member into a correspondingly-shaped hole formed in the stock. The cocking winch apparatus provides a straight and balanced draw to the crossbow bowstring, enabling a user to easily cock the bowstring by rotating a handle to draw the bowstring back, and to place it in cocked position in the crossbow trigger mechanism.

U.S. Pat. No. 6,116,580 to Hull discloses a mechanical winch having a ratchet lever having a single pawl which may be positioned in either one of two orientations in order to preclude clockwise or counterclockwise movement of the winch, drum or reel. In each orientation, the ratchet lever may also be positioned in a free wheeling position for the drum.

U.S. Pat. No. 3,986,588 to Kuzarov discloses an automobile mounted winch having a clutch-brake assembly comprising a disc shaped ratchet plate positioned between two friction shoes, acting as a clutch in one direction and a speed governor in another direction, and a stationary brake. A plurality of friction buttons extend through the ratchet plate in a generally circular pattern, with each button engaging both shoes. Each button has an expanded head portion, and the buttons are oppositely arranged in an alternating pattern to centrally locate the ratchet between the two shoes and provide proper frictional engagement of the buttons with the shoes.

SUMMARY

A non-limiting exemplary embodiment of a winch includes a bearing housing, a one way bearing disposed within the bearing housing, a bearing hub, a friction disk, a crank spool, a crank housing configured for rotatably retaining the crank spool, a crank shaft, and a crank handle coupled to a threaded second end of the crank shaft. In some embodiments, the one way bearing includes an outer ring attached to the bearing housing, and an inner ring. In certain embodiments, the bearing hub includes a cylindrical section and a disk. In some embodiments, at least a portion of the cylindrical section is disposed within and attached to the inner ring of the one way bearing. In certain embodiments, the friction disk includes opposing first and second surfaces, wherein the first surface is adjacent the disk of the bearing hub. In some embodiments, the crank spool includes opposing first and second disks, wherein the first disk is adjacent the second surface of the friction disk. In certain embodiments, the crank shaft extends through the bearing hub, through the friction disk, and into the crank spool, wherein a first end of the crank shaft is coupled to the crank spool.

Another non-limiting exemplary embodiment of a winch includes a bearing housing, a one way bearing disposed within the bearing housing, a bearing hub, a crank spool, a crank housing configured for rotatably retaining the crank spool, a crank shaft, and a threaded crank handle coupled to a threaded second end of the crank shaft. In some embodiments, the one way bearing includes an outer ring attached to the bearing housing, and an inner ring. In certain embodiments, the bearing hub includes a cylindrical section and a disk. In some embodiments, at least a portion of the cylindrical section is disposed within and attached to the inner ring of the one way bearing. In certain embodiments, the crank spool includes opposing first and second disks, wherein the first disk is adjacent the disk of the bearing hub. In some embodiments, the crank shaft extends through the bearing hub and into the crank spool, wherein a first end of the crank shaft is coupled to the crank spool.

DETAILED DESCRIPTION

One or more non-limiting exemplary embodiments are disclosed herein with reference to the accompanying drawings, wherein like numerals indicate like, but not necessarily identical, elements. It should be clearly understood that the embodiments described with reference to the drawings are merely exemplary in that any one or more of them may be implemented in alternative manner as may become apparent to a person of ordinary skills. The figures, wherein some features may have been exaggerated or minimized to illustrate details of particular components, are not necessarily to scale. Specific structural and/or functional features and details disclosed herein are not to be interpreted as limiting, but should rather be treated as a basis for teaching one of ordinary skills. There is no intent, implied or otherwise, to limit the disclosure in any way, shape or form to the embodiments illustrated and described herein. Accordingly, any and all variants for providing structures and/or functionalities similar to those described herein are considered as being within the metes and bounds of the instant disclosure.

Figure 1A:
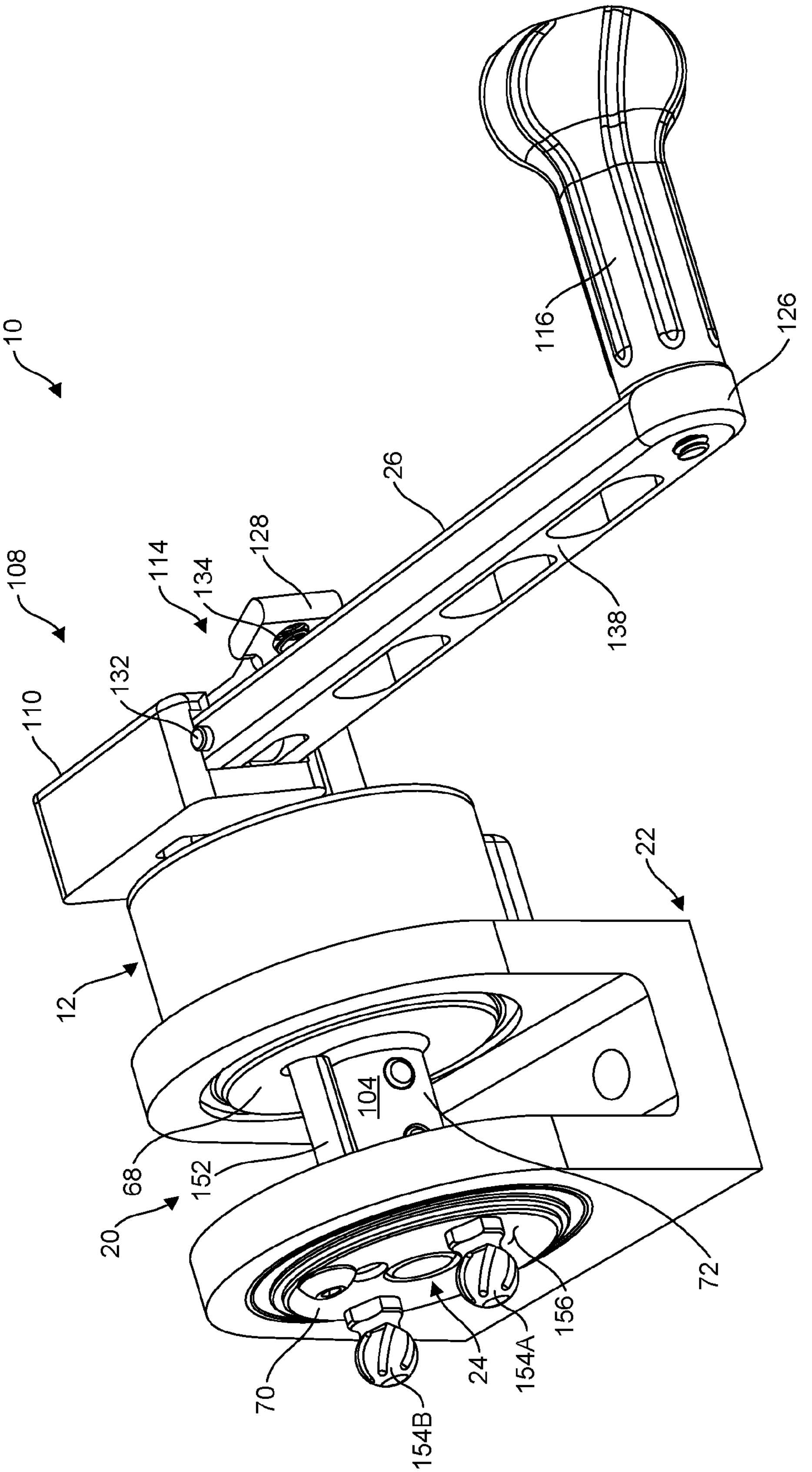
FIGS. 1A and 1B are perspective views, as viewed from opposite sides, of a non-limiting exemplary embodiment of a winch of the instant disclosure.
Figure 1B:
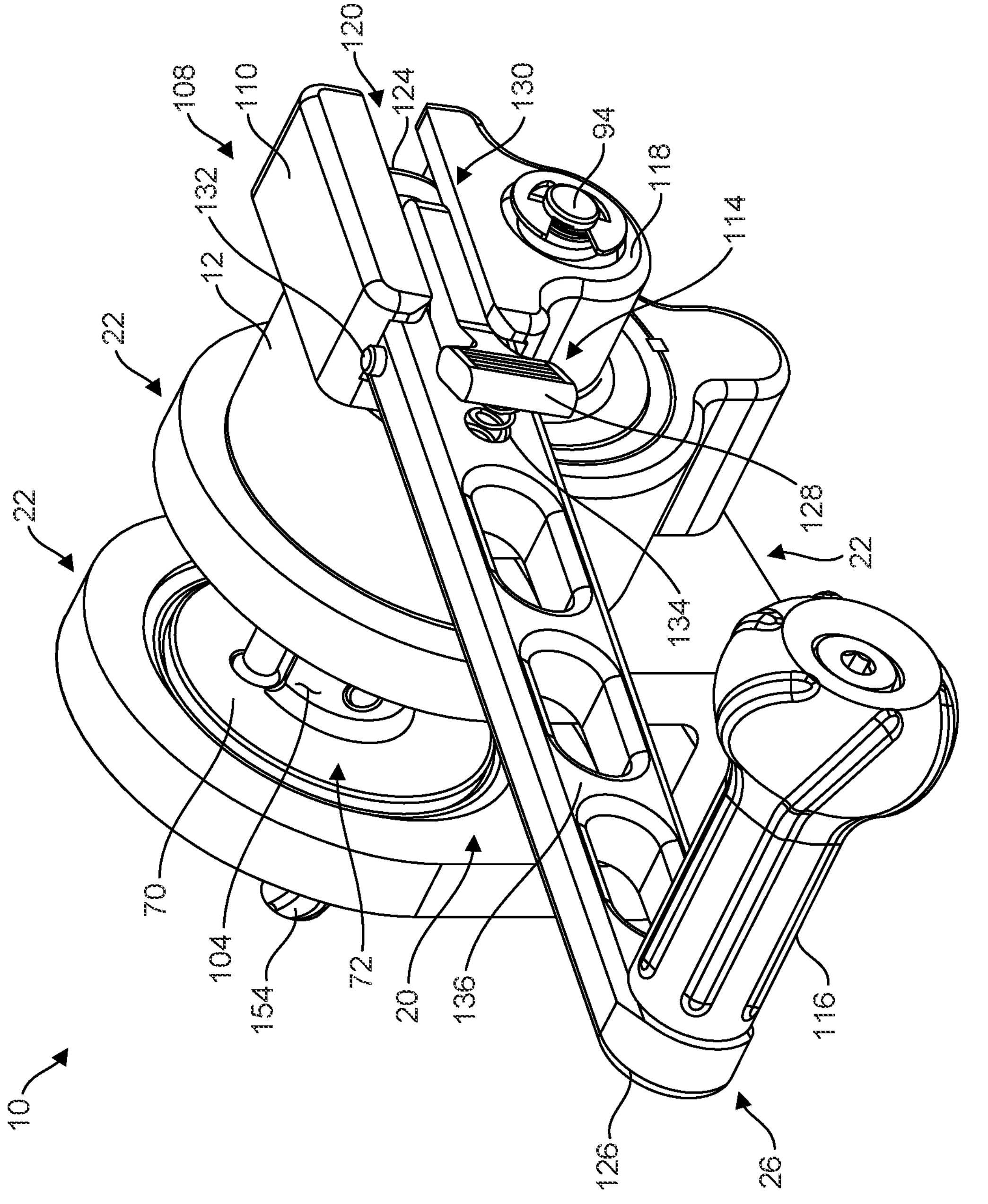
Figure 2:
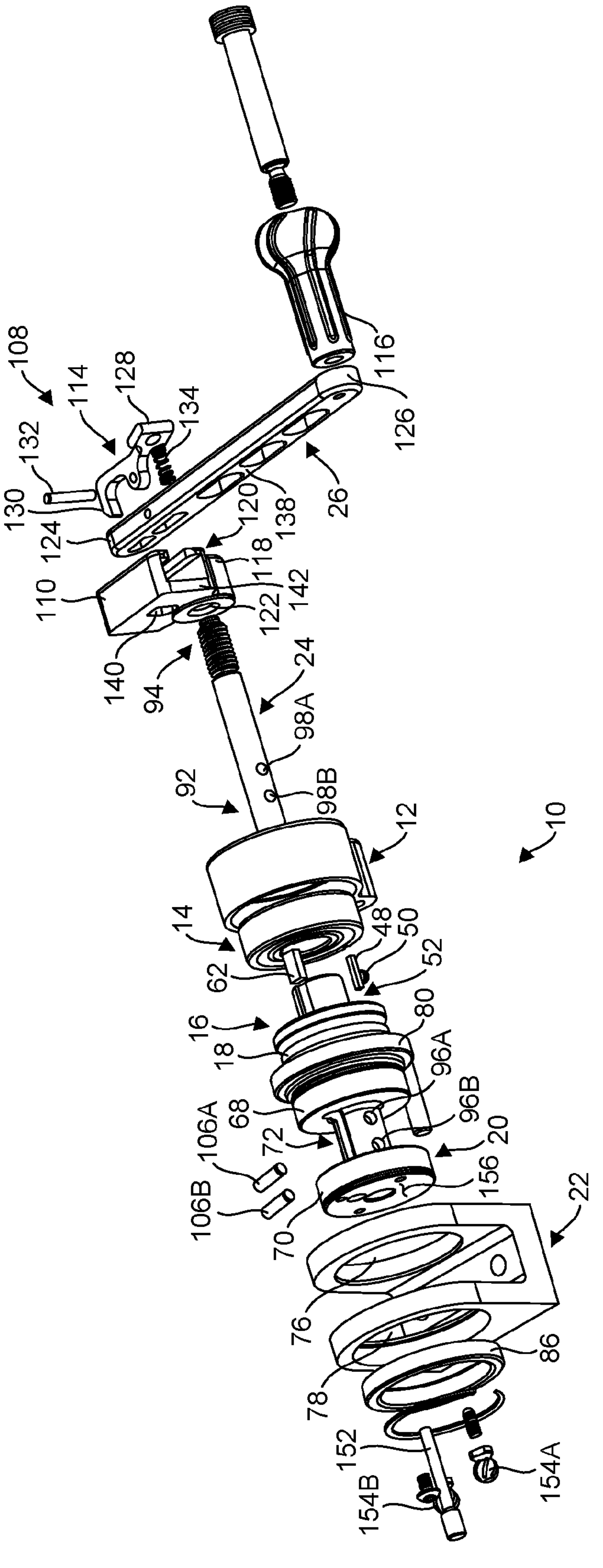
FIG. 2 is a perspective view of the winch of FIG. 1 in a disassembled state.

FIGS. 1A and 1B are perspective views of a non-limiting exemplary embodiment of a winch 10 of the instant disclosure as view from opposite sides; and FIG. 2 is a perspective view of the winch 10 in an unassembled state illustrating a pre-assembled arrangement of the various components. As will be described in further detail infra, the winch 10 includes a bearing housing 12, a one way bearing 14, a bearing hub 16, a friction disk 18, a crank spool 20, a crank housing 22, a crank shaft 24, and a crank handle 26.

Figure 3A:
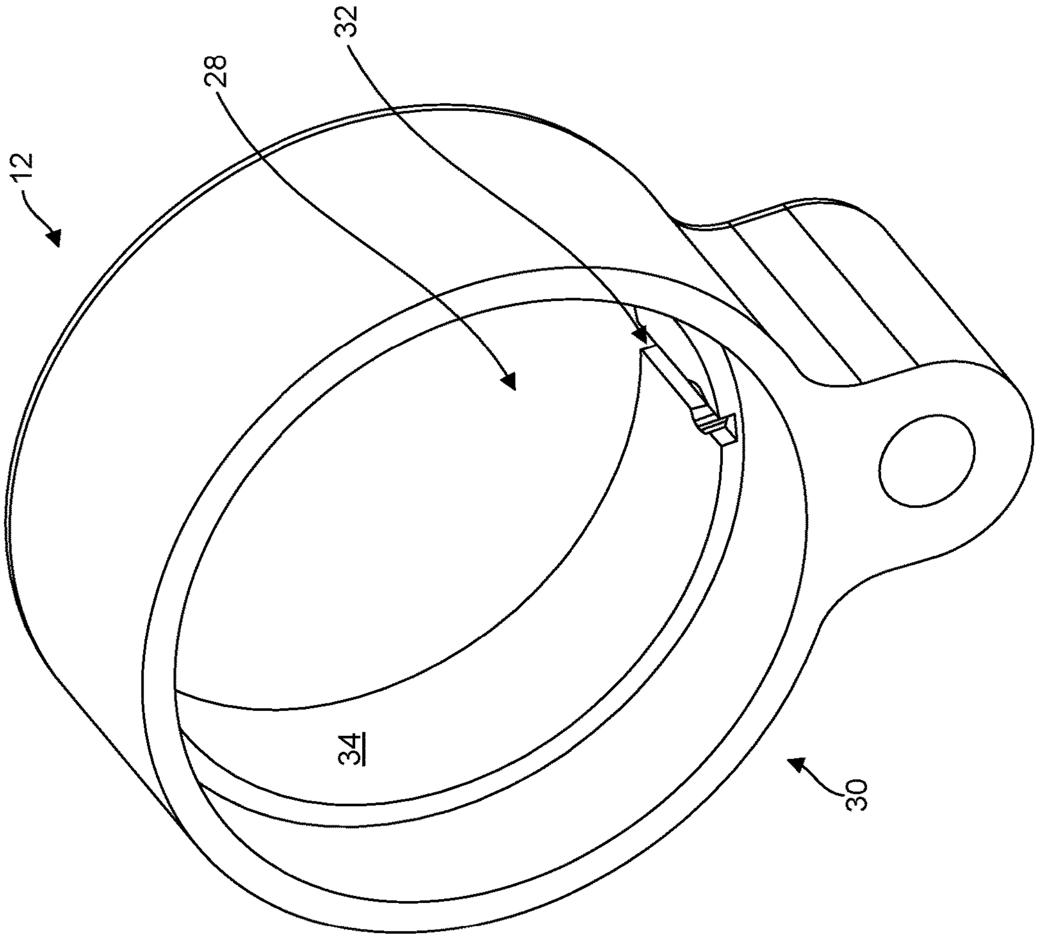
FIGS. 3A and 3B are perspective views of a non-limiting exemplary embodiment of a bearing housing for the winch of FIG. 1 as viewed from opposite sides.
Figure 3B:
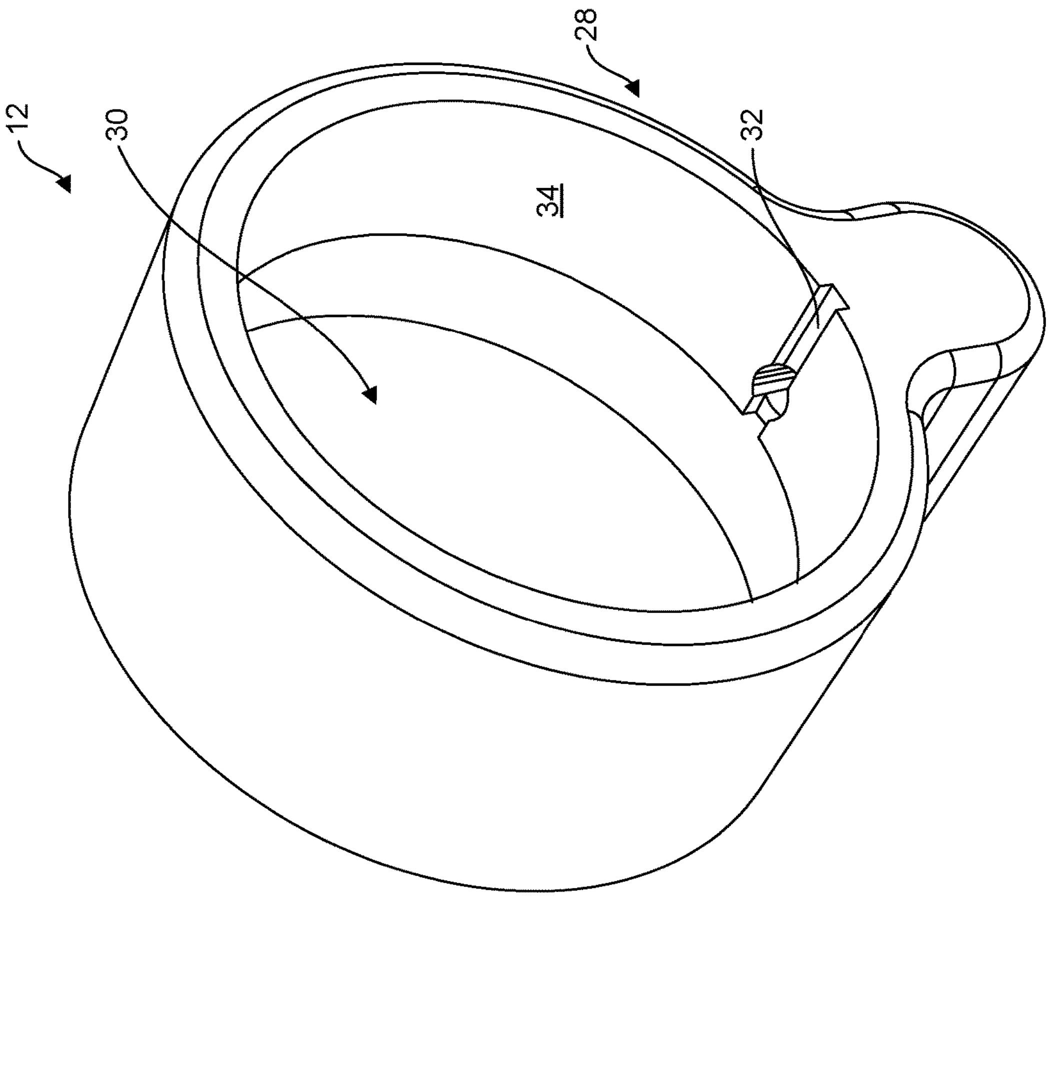
Figure 3C:
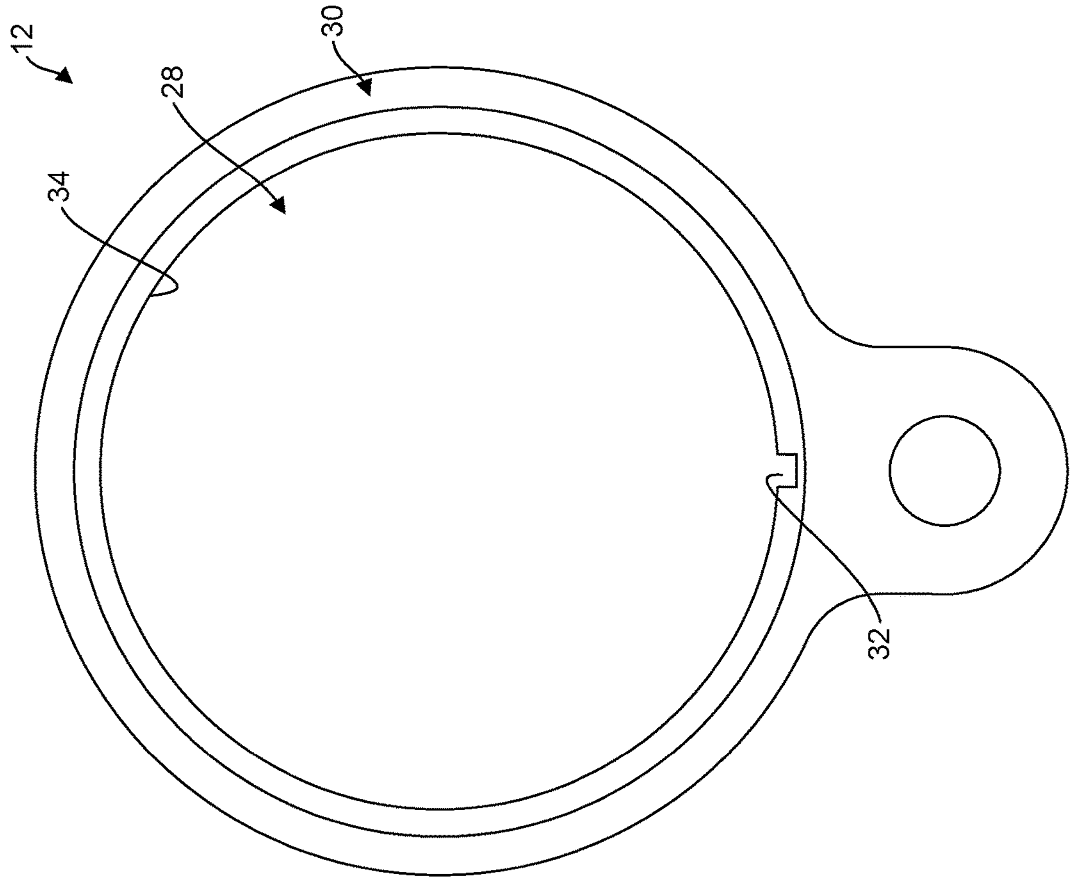
FIGS. 3C and 3D, respectively, are side views of the bearing housing illustrated in FIGS. 3A and 3B.
Figure 3D:
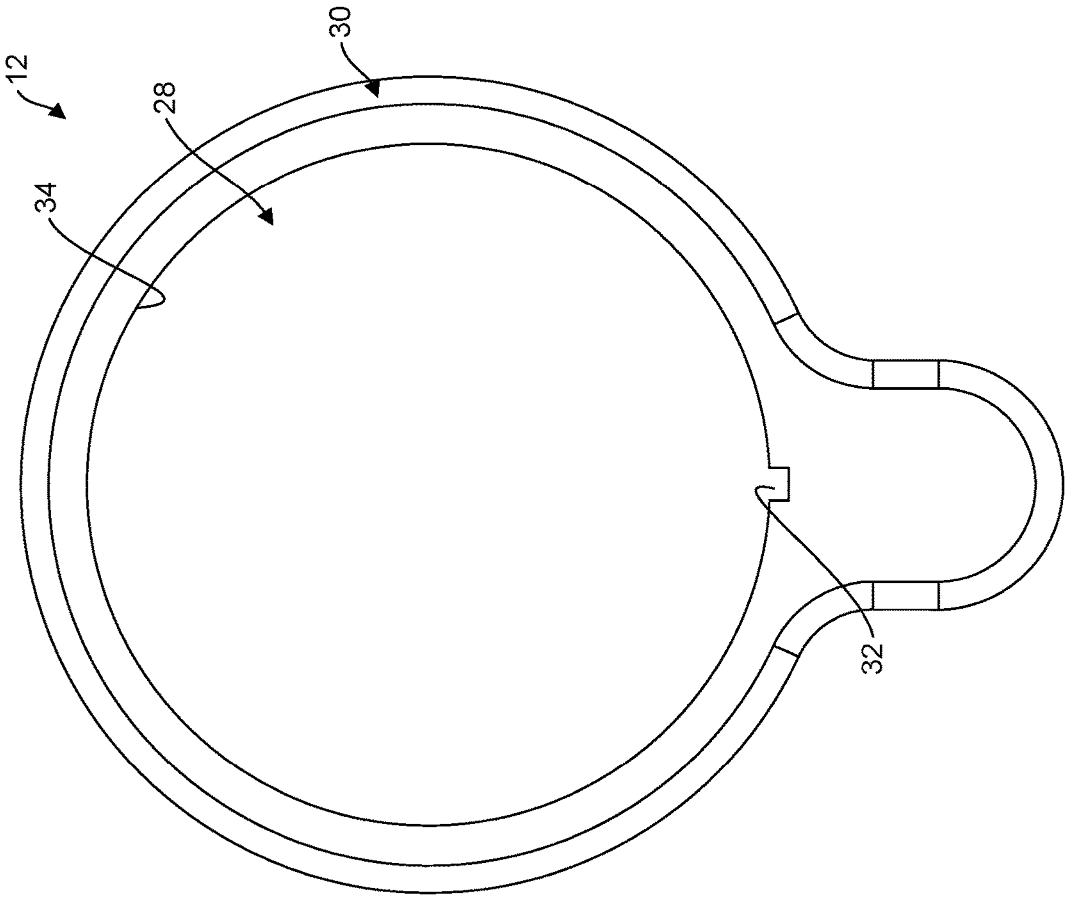

FIGS. 3A and 3B are perspective views of a non-limiting exemplary embodiment of the bearing housing 12 as viewed from opposite sides, and FIGS. 3C and 3D, respectively, are side views of the bearing housing 12 corresponding to FIGS. 3A and 3B. In some embodiments, the bearing housing 12 includes a first and a second opening 28 and 30, respectively, and a keyway 32 in an inner surface 34 of the first opening 28.

Figure 4A:
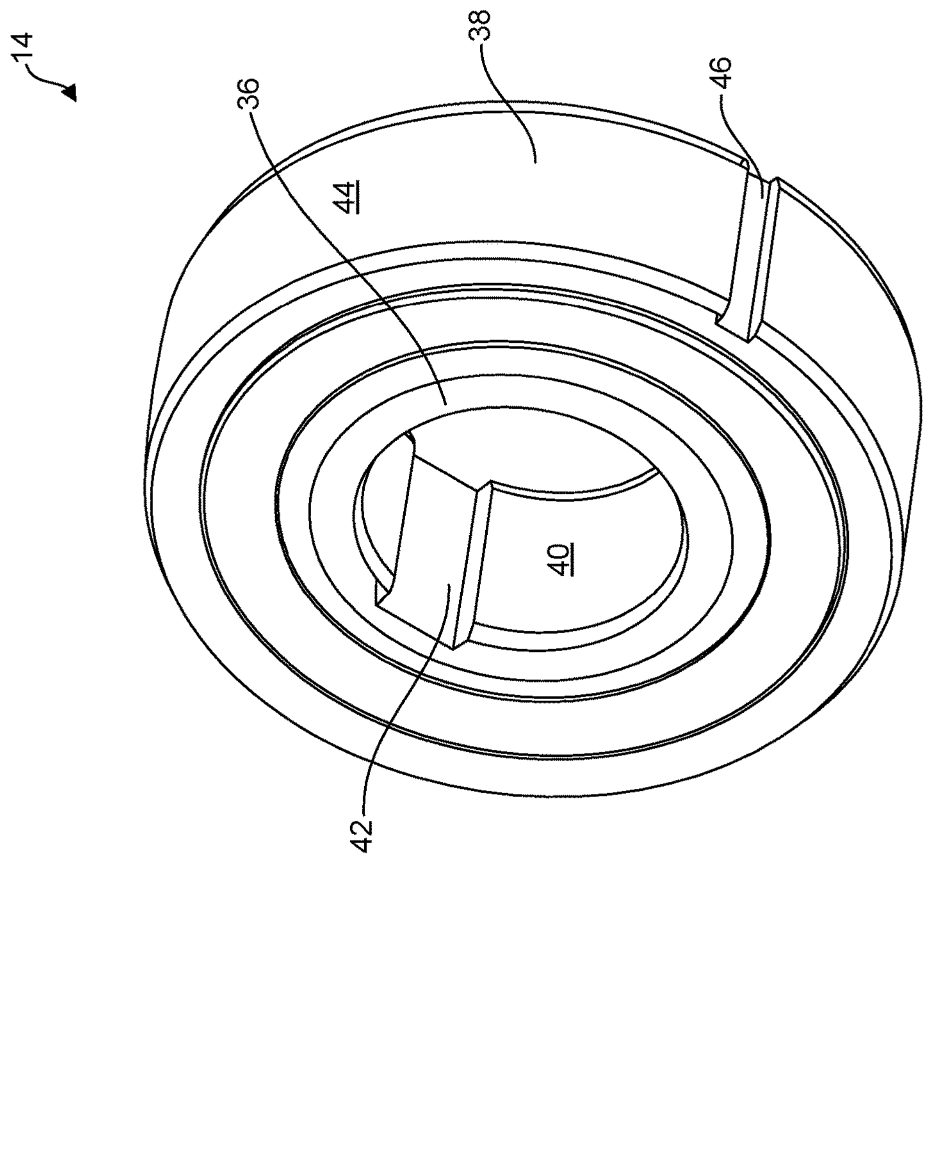
FIGS. 4A and 4B are perspective views of a non-limiting exemplary embodiment of a one way bearing for the winch of FIG. 1 as viewed from opposite sides.
Figure 4B:
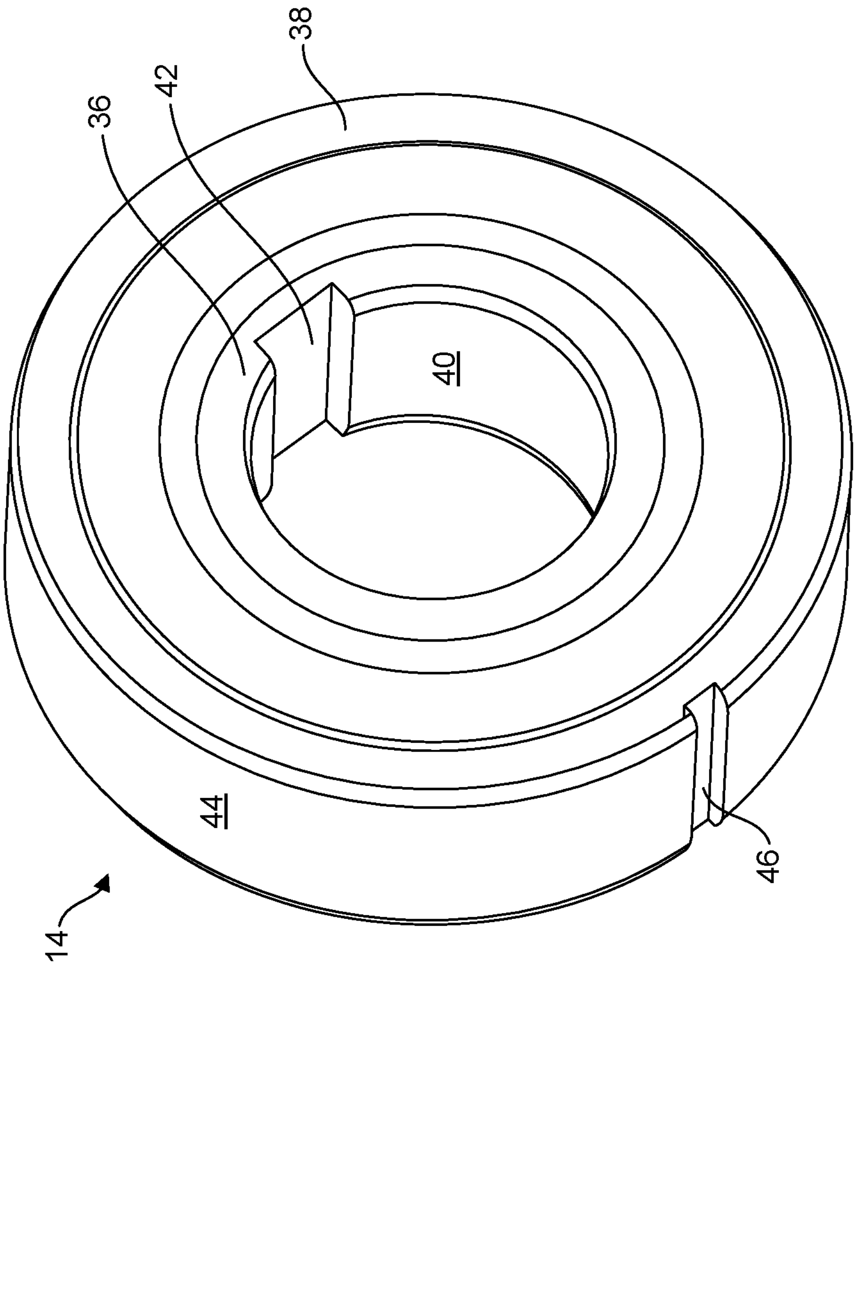
Figure 4C:
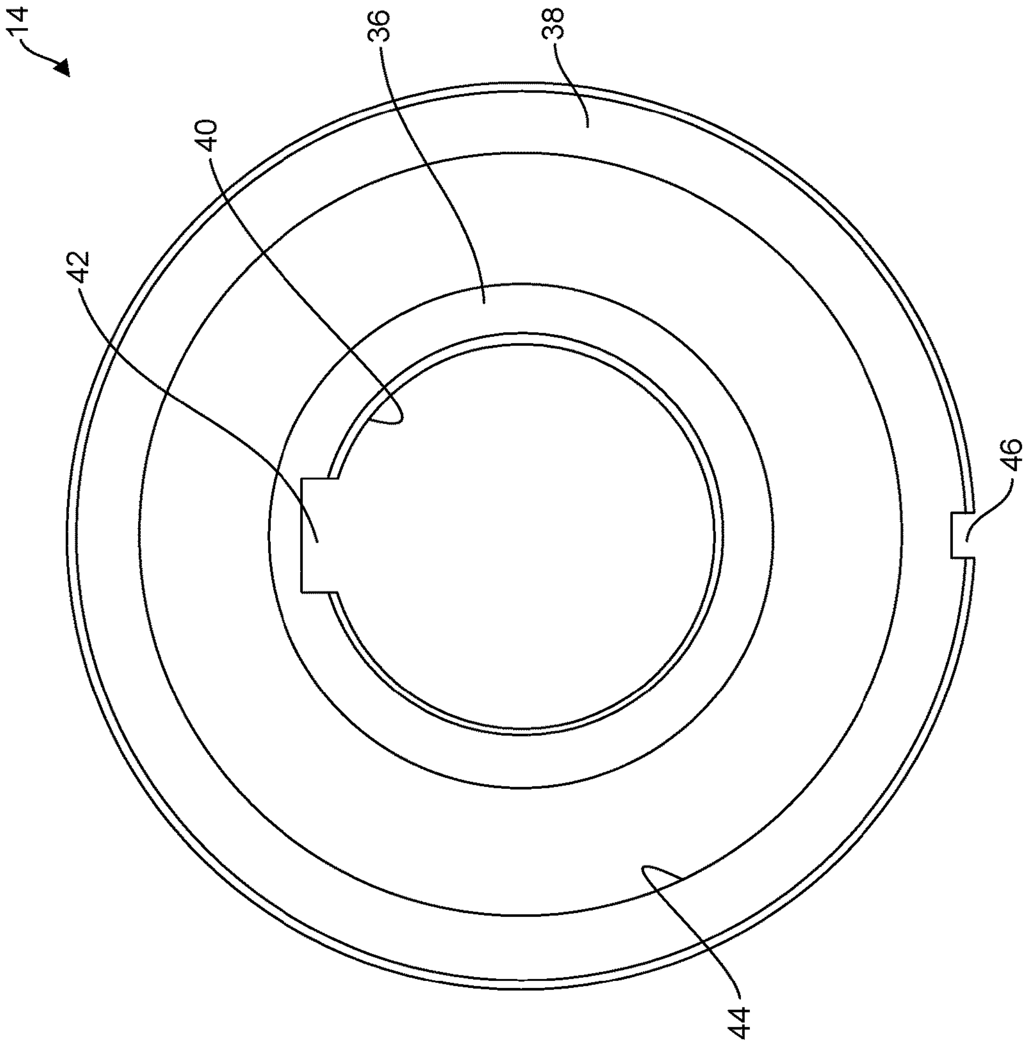
FIG. 4C is a side view of the one way bearing illustrated in FIGS. 4A and 4B.

FIGS. 4A and 4B are perspective views of a non-limiting exemplary embodiment of the one way bearing 14 as viewed from opposite sides, and FIG. 4C is a side view of the one way bearing 14. Since one way bearings are well known in the art, a detailed description of the structure of the one way bearing 14 is considered not necessary. Briefly, the one way bearing 14 is defined at least in part by an inner ring 36 and an outer ring 38, wherein one of the rings 36 and 38 is rotatable relative to the other in a first direction but is inhibited from rotating relative to that other in a second direction opposite the first direction. For instance, the inner ring 36 may rotate in the first direction relative to a stationary outer ring 38, but the inner ring 36 is inhibited from rotating in the second direction relative to the stationary outer ring 38. And, the outer ring 38 may rotate in the second direction relative to a stationary inner ring 36, but the outer ring 38 is inhibited from rotating in the first direction relative to the stationary inner ring 36.

Figure 6A:
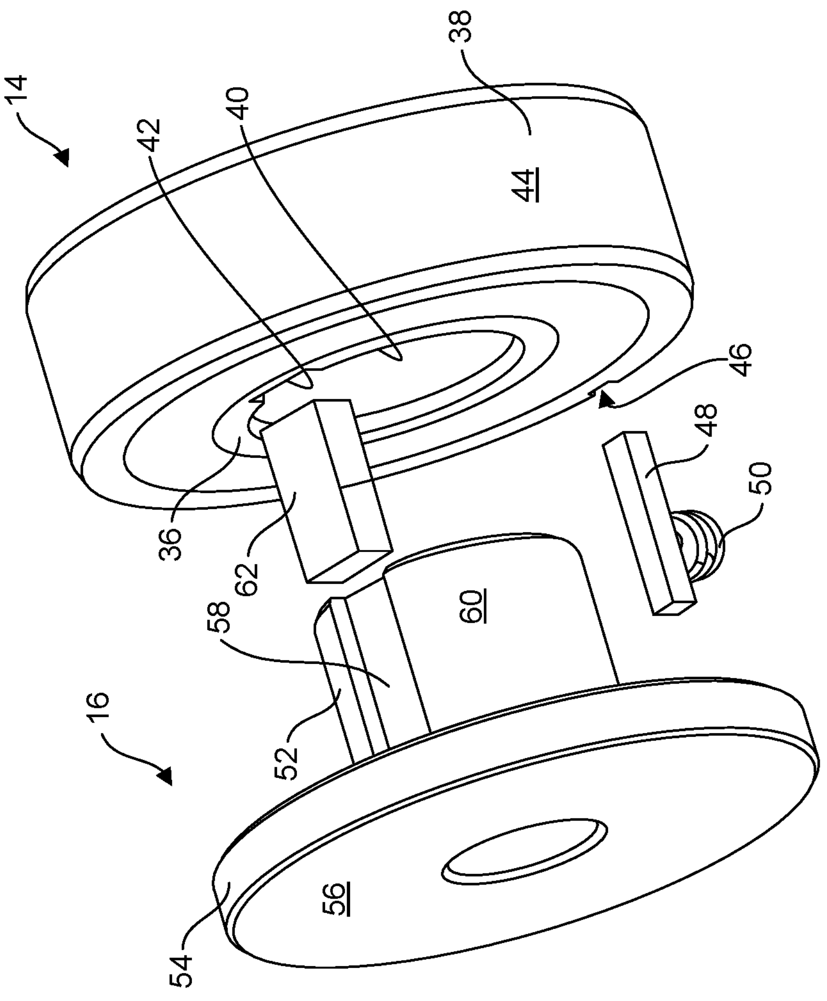
FIG. 6A illustrates the one way bearing of FIG. 4A and the bearing hub of FIG. 5A in a pre-assembled arrangement.
Figure 6B:
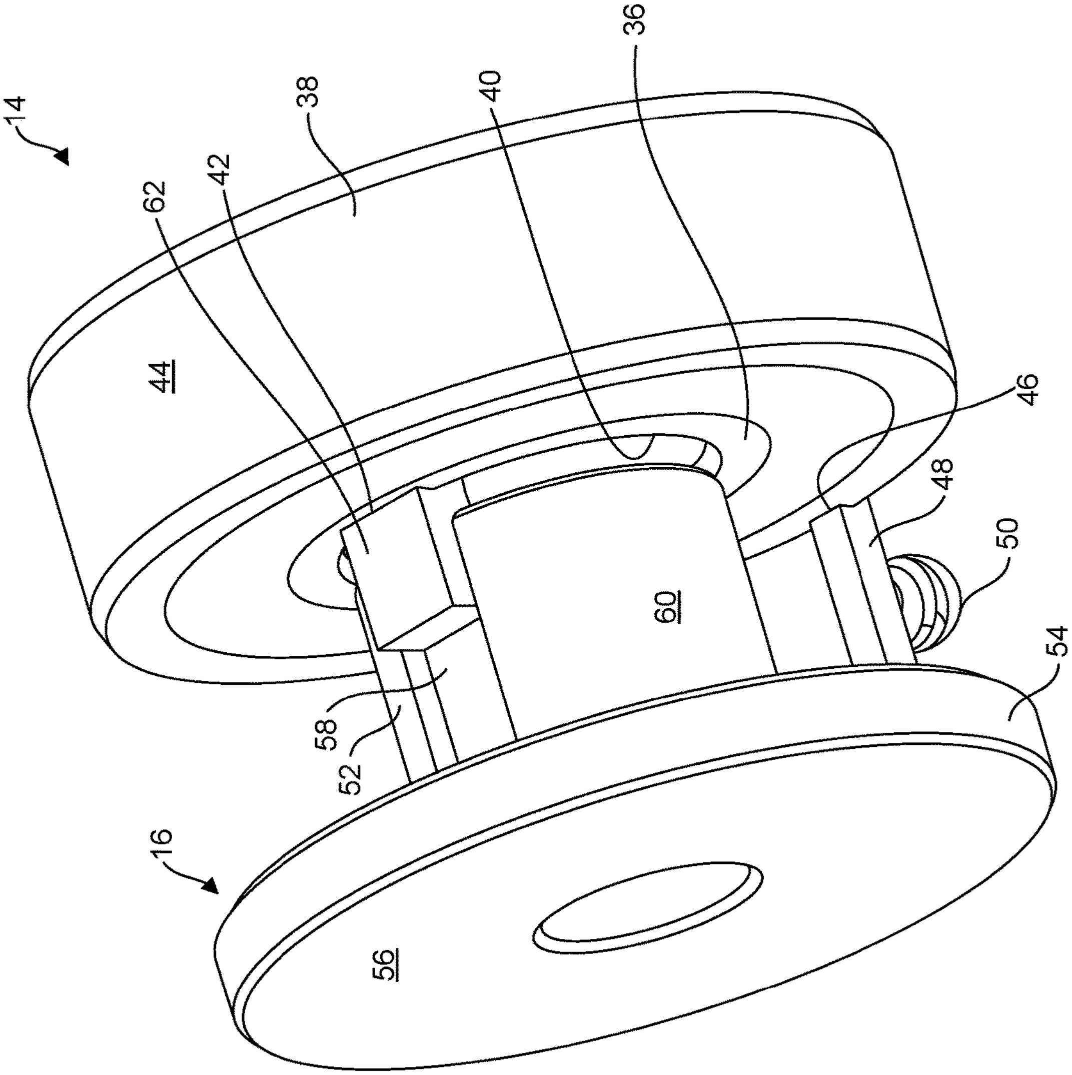
FIG. 6B illustrates the one way bearing of FIG. 4A and the bearing hub of FIG. 5A in a partially assembled arrangement.

In some embodiments of the one way bearing 14, an inner surface 40 of the inner ring 36 includes a keyway 42, and an outer surface 44 of the outer ring 38 includes a key seat 46. In certain embodiments, the bearing housing 12 is configured for housing, and forming a keyed joint with, the one way bearing 14. In some embodiments, the first opening 28 is configured for housing, and forming a keyed joint with, the one way bearing 14. Accordingly, perhaps as best illustrated in FIGS. 6A and 6B, the one way bearing 14 is placed within the first opening 28 with the outer surface 44 of the outer ring 38 abutting or adjacent to the inner surface 34 of the first opening 28. In certain embodiments, the keyway 32 and the key seat 46 are aligned and coupled to each other with a key 48 to form a keyed joint. In some embodiments, a fastener 50 is provided for ensuring the integrity of the keyed joint, i.e., to secure the key 48 for ensuring that it does not dislodge.

It should be readily apparent that when the bearing housing 12 and the one way bearing 14 are so assembled as described supra, the inner ring 36 of the one way bearing 14 will be enabled to rotate in a first direction while the outer ring 38 of the one way bearing 14 is held stationary by the bearing housing 12, and the inner ring 36 of the one way bearing 14 will be inhibited from rotating in a second direction opposite the first direction while the outer ring 38 of the one way bearing 14 is held stationary by the bearing housing 12.

Figure 5A:
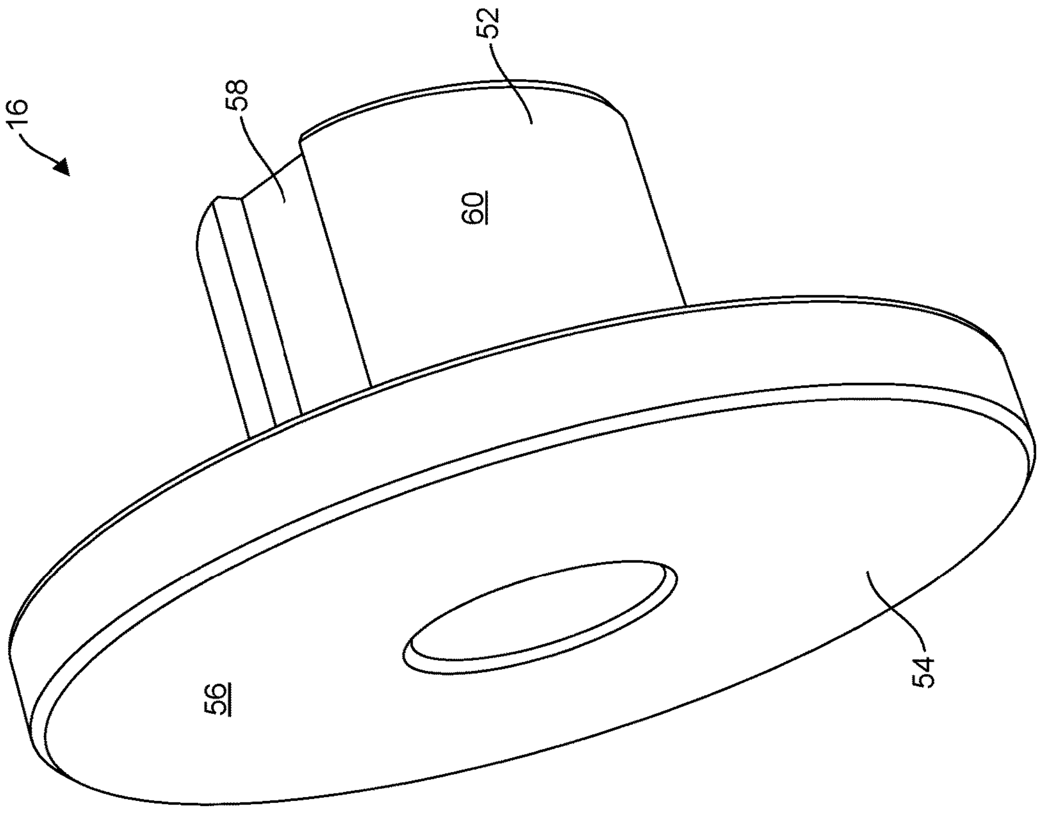
FIGS. 5A and 5B are perspective views of a non-limiting exemplary embodiment of a bearing hub for the winch of FIG. 1 as viewed from opposite sides.
Figure 5B:
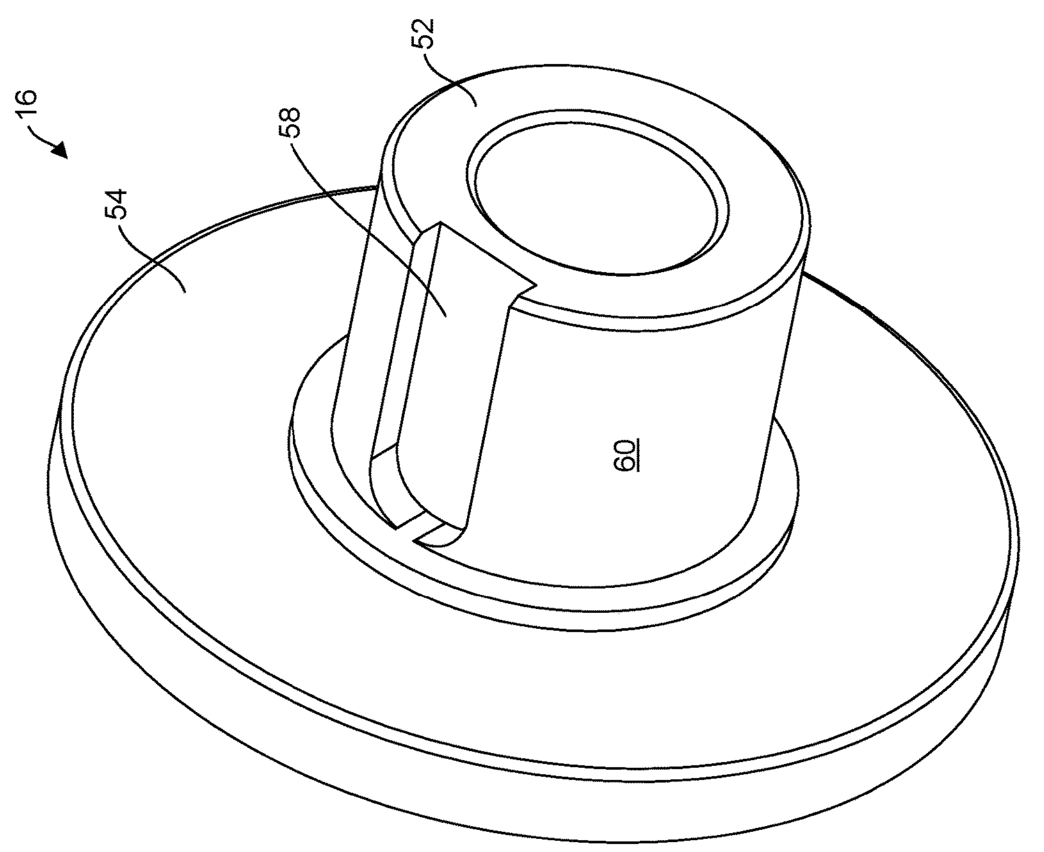
Figure 5C:
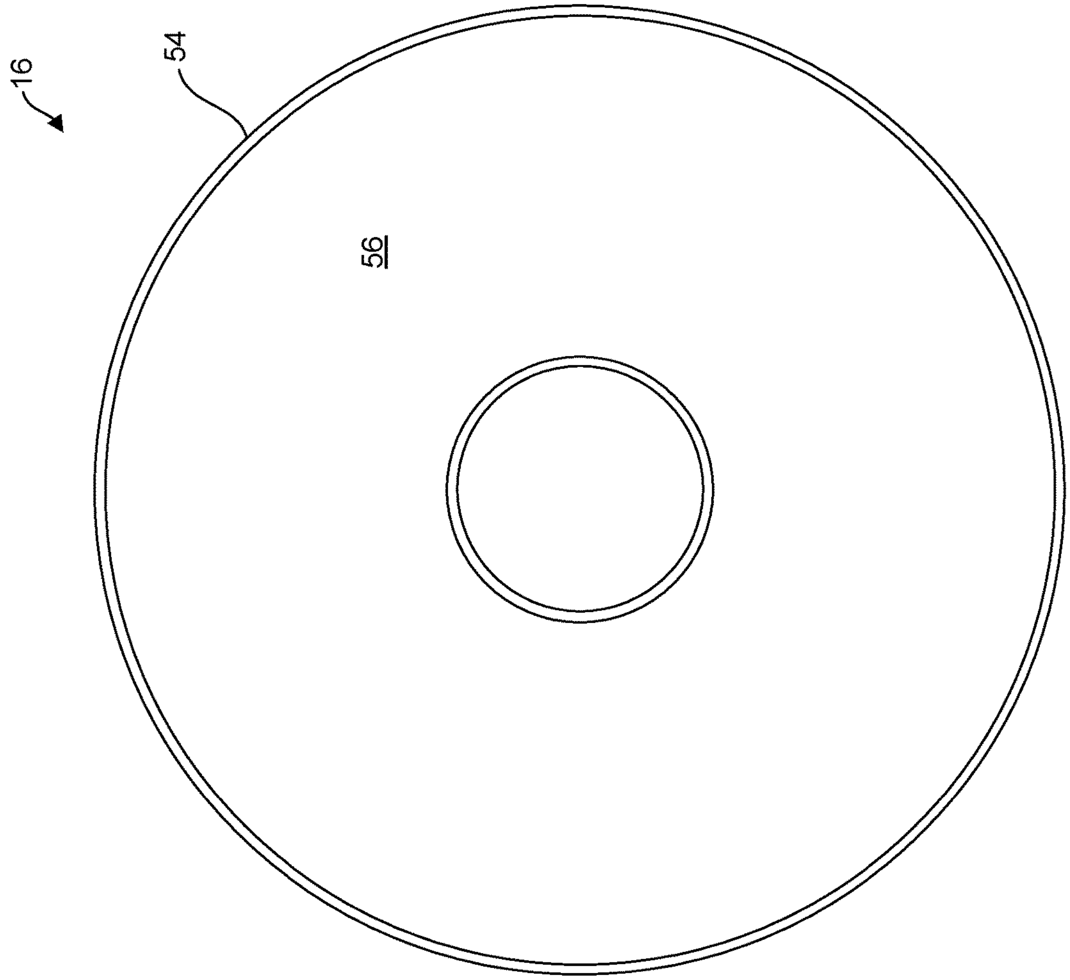
FIGS. 5C and 5D, respectively, are side views of the bearing hub illustrated in FIGS. 5A and 5B.
Figure 5D:
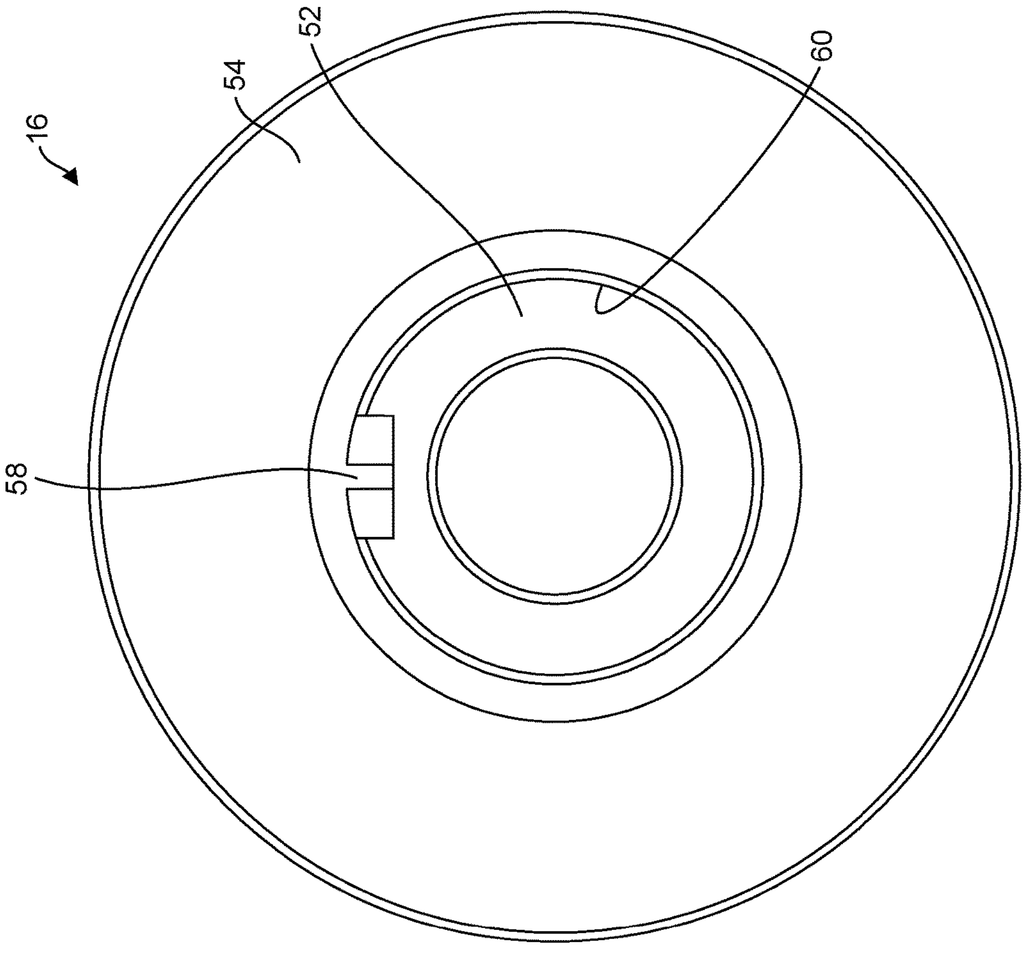

FIGS. 5A and 5B are perspective views of a non-limiting exemplary embodiment of the bearing hub 16 as viewed from opposite sides, and FIGS. 5C and 5D, respectively, are side views of the bearing hub 16 corresponding to FIGS. 5A and 5B. In some embodiments, the bearing hub includes a cylindrical section 52, a disk 54, an outer surface 56, and a key seat 58 in an outer surface 60 of the cylindrical section 52. In certain embodiments, perhaps as best illustrated in FIGS. 6A and 6B, at least a portion of the cylindrical section 52 is disposed within the inner ring 36 of the one way bearing 14. In some embodiments, the cylindrical section 52 extends through the inner ring 36 and at least a portion of the cylindrical section 52 farthest from the disk 54 protrudes from or extends out from the inner ring 36. In other words, at least a portion of the cylindrical section 52 protrudes from or extends out of the inner ring 36 on the side opposite from the side where the cylindrical section 52 enters the inner ring 36. The key seat 58 in the outer surface 60 and the keyway 42 in the inner surface 40 of the inner ring 36 are aligned and coupled to each other with a key 62 to form a keyed joint.

In a non-limiting exemplary embodiment, the second opening 30 in the bearing housing 12 is configured for rotatably retaining or housing at least a portion of the disk 54 of the bearing hub 16.

Figure 7A:
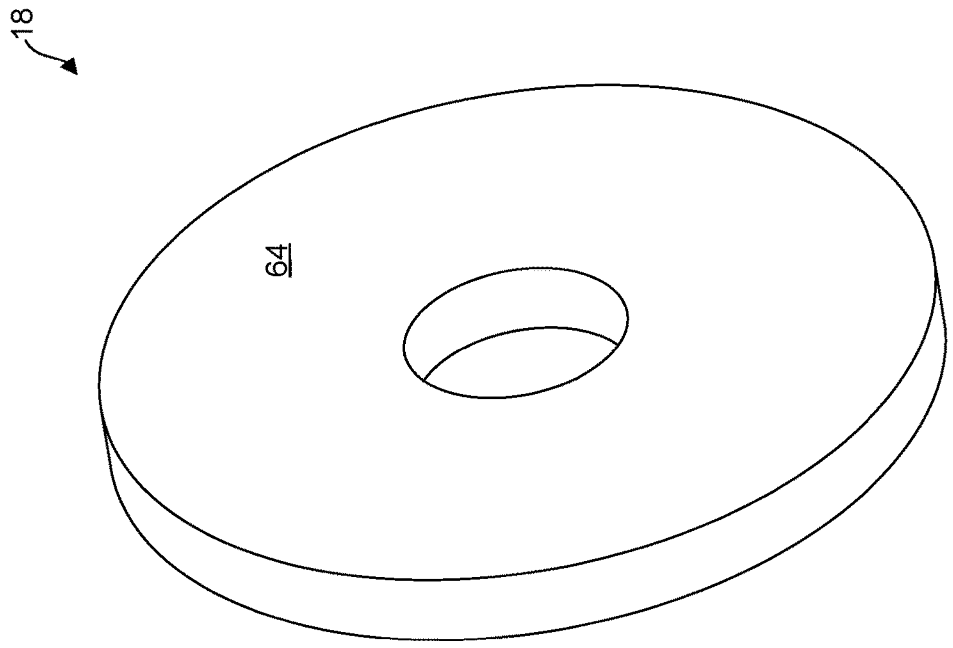
FIGS. 7A and 7B are perspective views of a non-limiting exemplary embodiment of a friction disk for the winch of FIG. 1 as viewed from opposite sides.
Figure 7B:
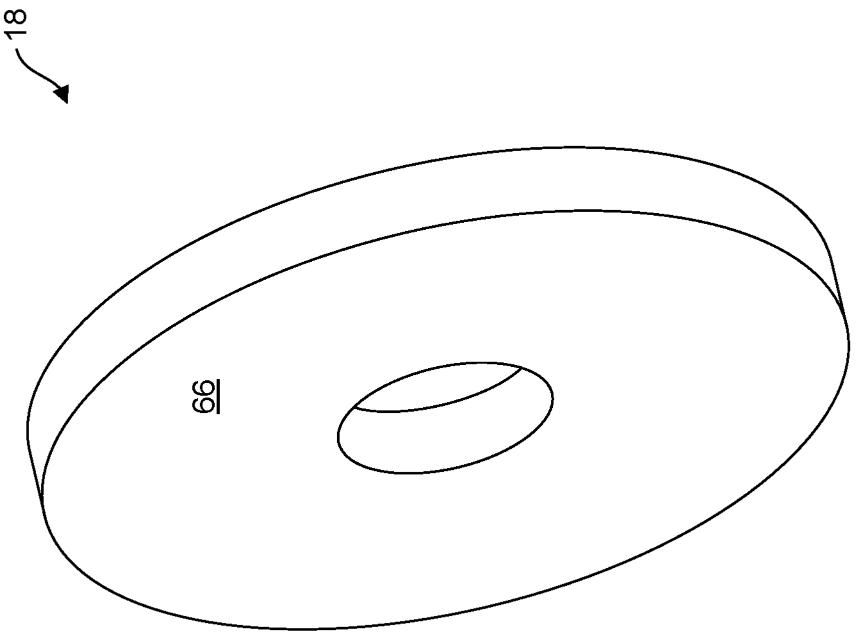

FIGS. 7A and 7B are perspective views of a non-limiting exemplary embodiment of the friction disk 18 as viewed from opposite sides. In some embodiments, the friction disk 18 includes opposing first and second surfaces 64 and 66, respectively. In certain embodiments, the first surface 64 of the friction disk 18 abuts or is adjacent to the outer surface 56 of the disk 54.

In a non-limiting exemplary embodiment, the second opening 30 in the bearing housing 12 is configured for rotatably retaining or housing both the entirety of the disk 54 of the bearing hub 16 and at least a portion of the friction disk 18.

Figure 8A:
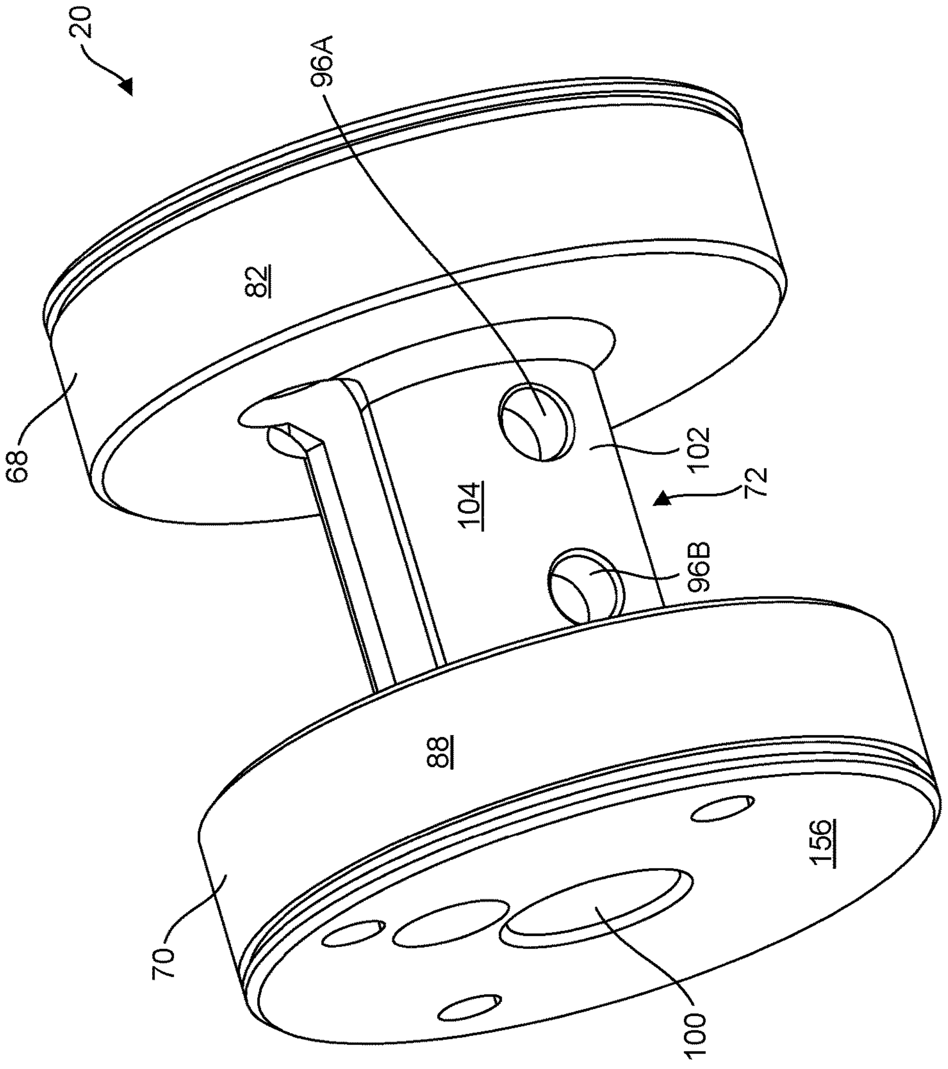
FIGS. 8A and 8B are perspective views of a non-limiting exemplary embodiment of a crank spool for the winch of FIG. 1 as viewed from opposite sides.
Figure 8B:
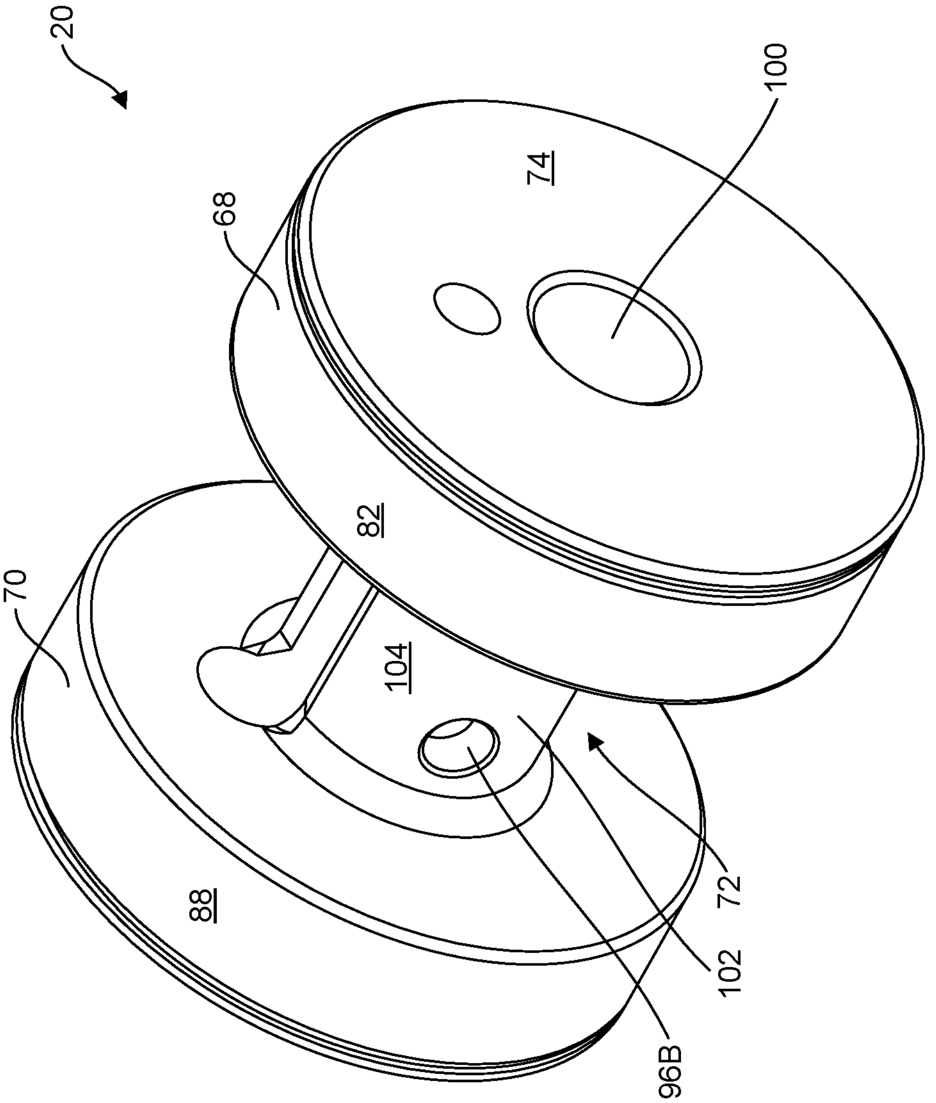
Figure 8C:
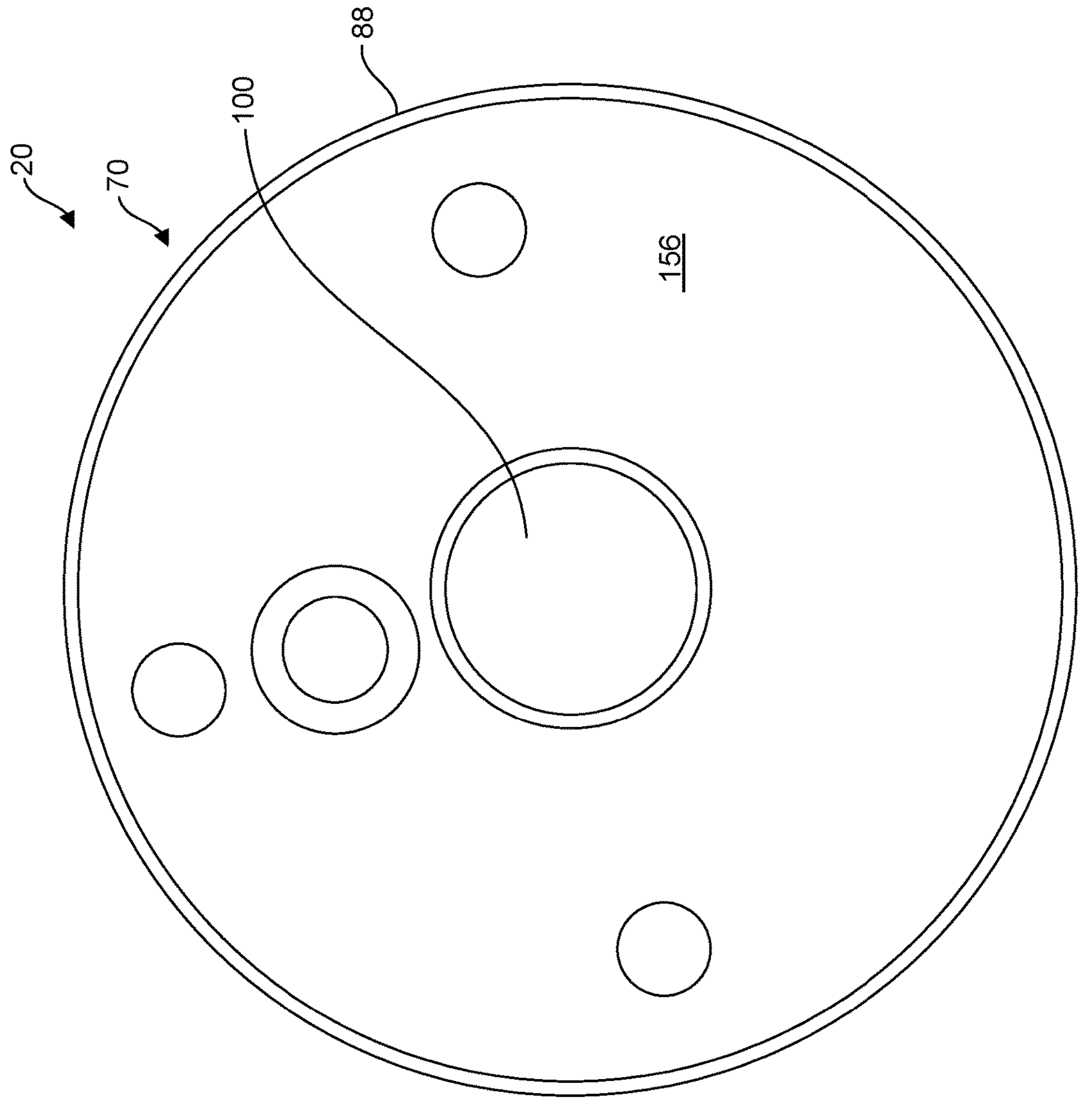
FIGS. 8C and 8D, respectively, are side views of the crank spool illustrated in FIGS. 8A and 8B.
Figure 8D:
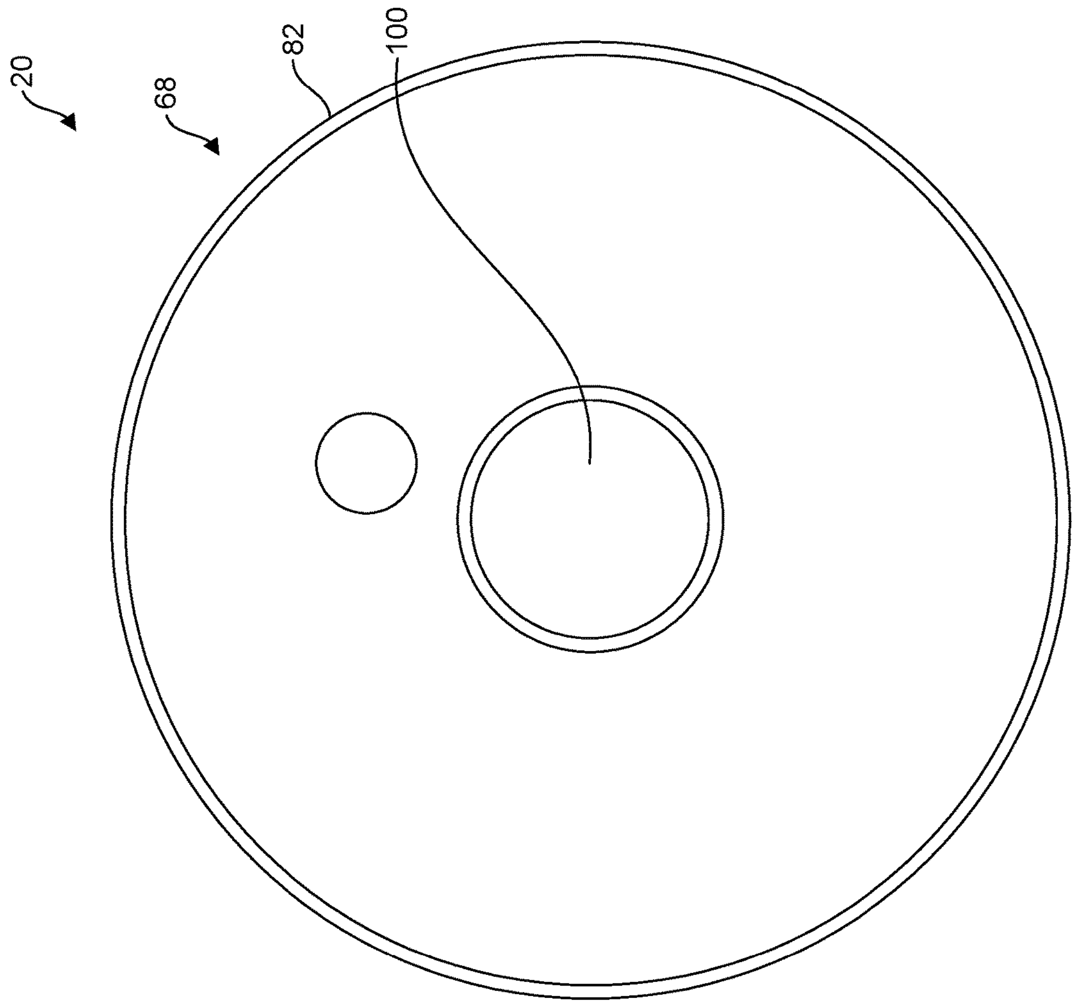

FIGS. 8A and 8B are perspective views of a non-limiting exemplary embodiment of the crank spool 20 viewed from opposite sides, and FIGS. 8C and 8D, respectively, are side views of the crank spool 20 corresponding to FIGS. 8A and 8B. In some embodiments, the crank spool 20 includes opposing first and second disks 68 and 70, respectively, and a cylindrical section 72 extending between the disks 68 and 70. In certain embodiments, an outer surface 74 of the first disk 68 abuts or is adjacent to the second surface 66 of the friction disk 18.

Figure 9A:
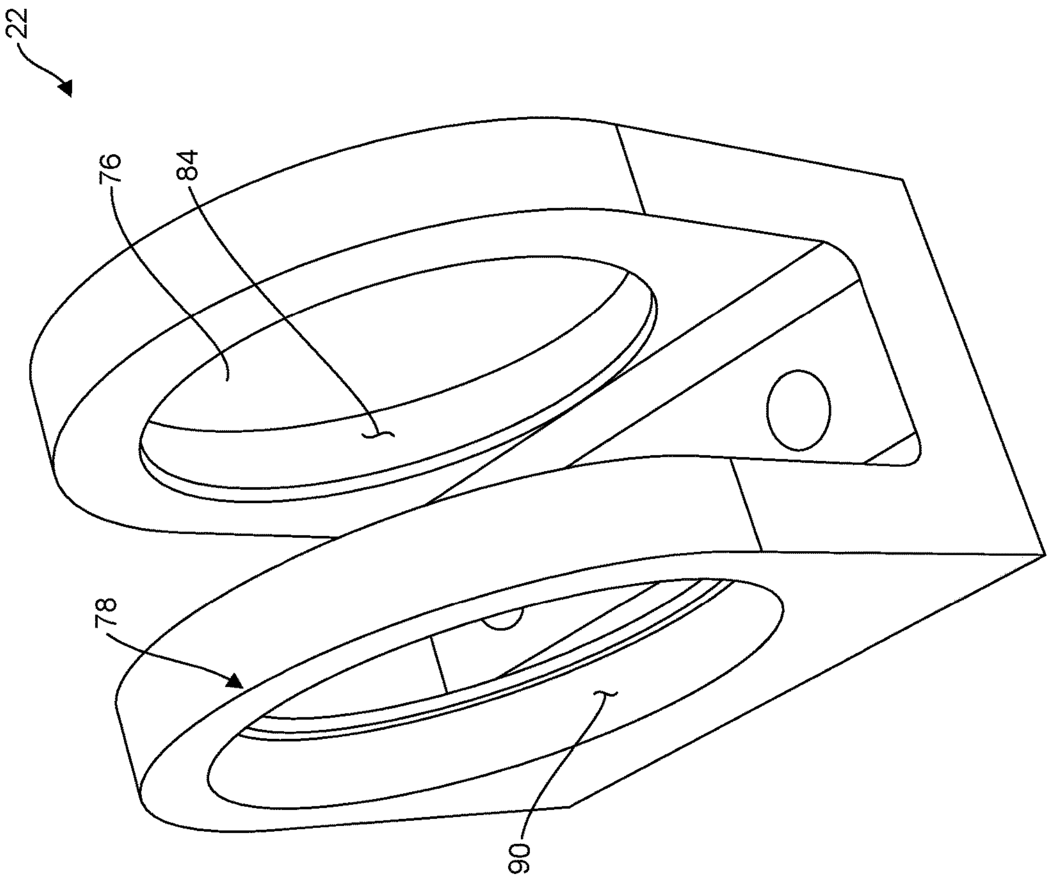
FIGS. 9A and 9B are perspective views of a non-limiting exemplary embodiment of a crank housing for the winch of FIG. 1 as viewed from opposite sides.
Figure 9B:
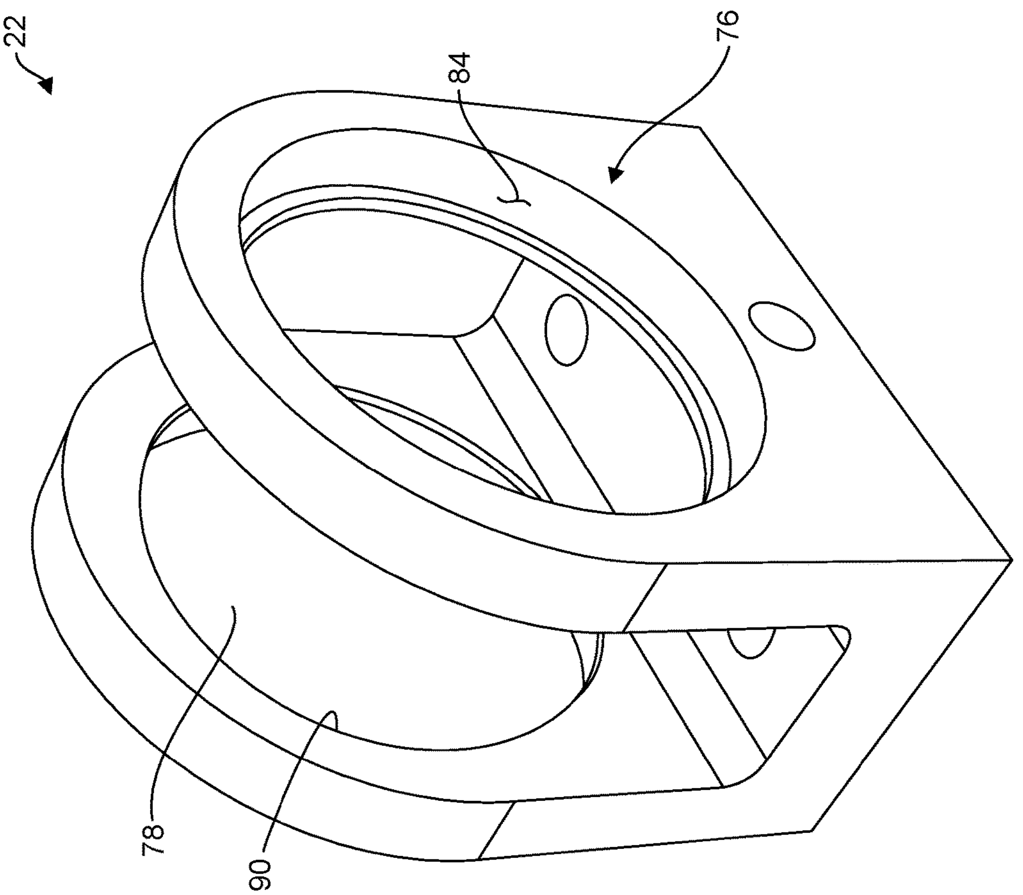
Figure 9C:
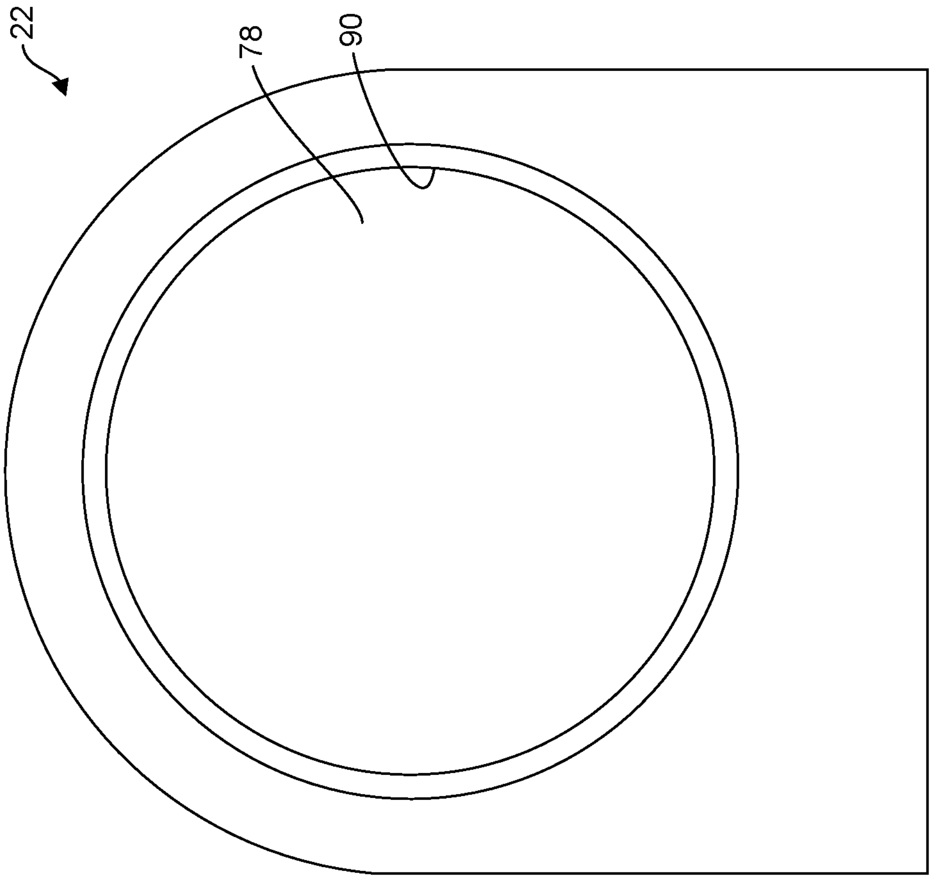
FIGS. 9C and 9D, respectively, are side views of the crank housing illustrated in FIGS. 9A and 9B.
Figure 9D:
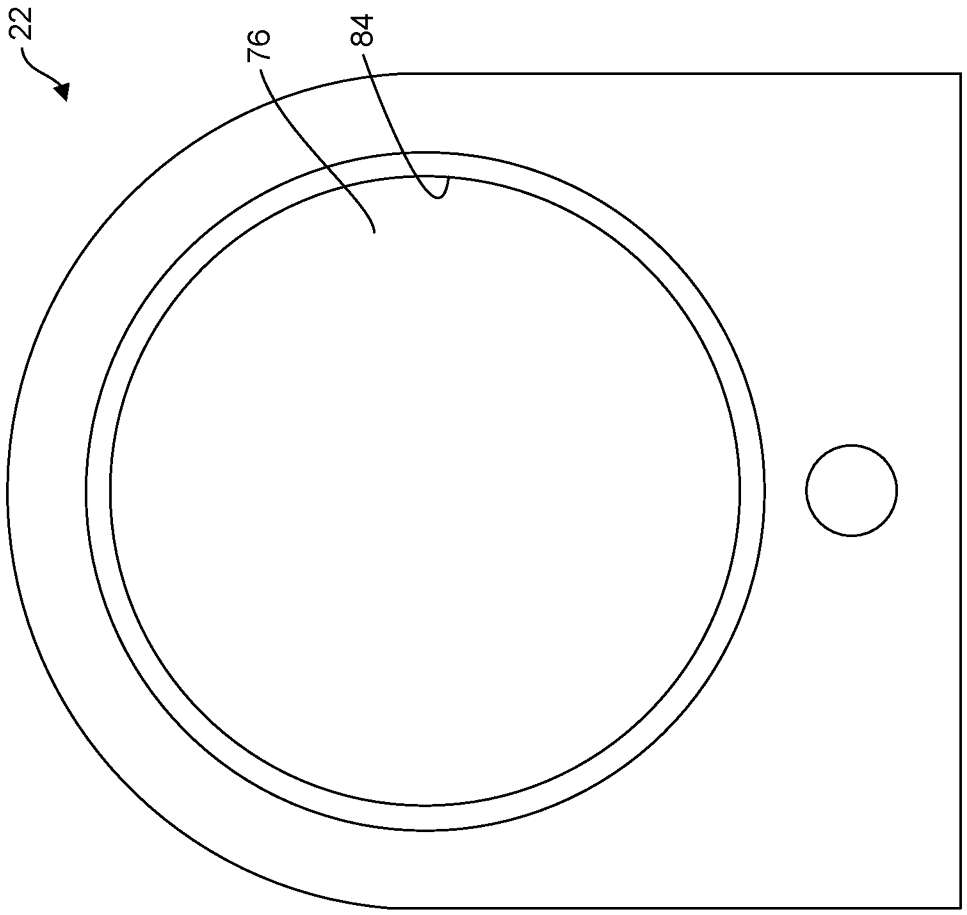

FIGS. 9A and 9B are perspective views of a non-limiting exemplary embodiment of the crank housing 22 as viewed from opposite sides, and FIGS. 9C and 9D, respectively, are side views of the crank housing 22 corresponding to FIGS. 9A and 9B. In some embodiments, the crank housing 22 is defined at least in part by opposing first and second openings 76 and 78, respectively. In certain embodiments, the crank housing 22 is configured for rotatably retaining the crank spool 20. To that end, the first and second disks 68 and 70 of crank spool 20, respectively, are rotatably housed or retained in the first and second openings 76 and 78 of the crank housing 22.

In a non-limiting exemplary embodiment, the winch 10 includes a first crank bearing 80 disposed between an outer surface 82 of the first disk 68 of the crank spool 20 and an inner surface 84 of the first opening 76 in the crank housing 22; and the winch 10 includes a second crank bearing 86 disposed between an outer surface 88 of the second disk 70 of the crank spool 20 and an inner surface 90 of the second opening 78 in the crank housing 22.

It should be readily apparent that when the crank spool 20 and the crank housing 22 are so assembled as described supra, the crank spool 20 is enabled to rotate un-hindered in either direction when the crank housing 22 is held stationary.

Figure 10:
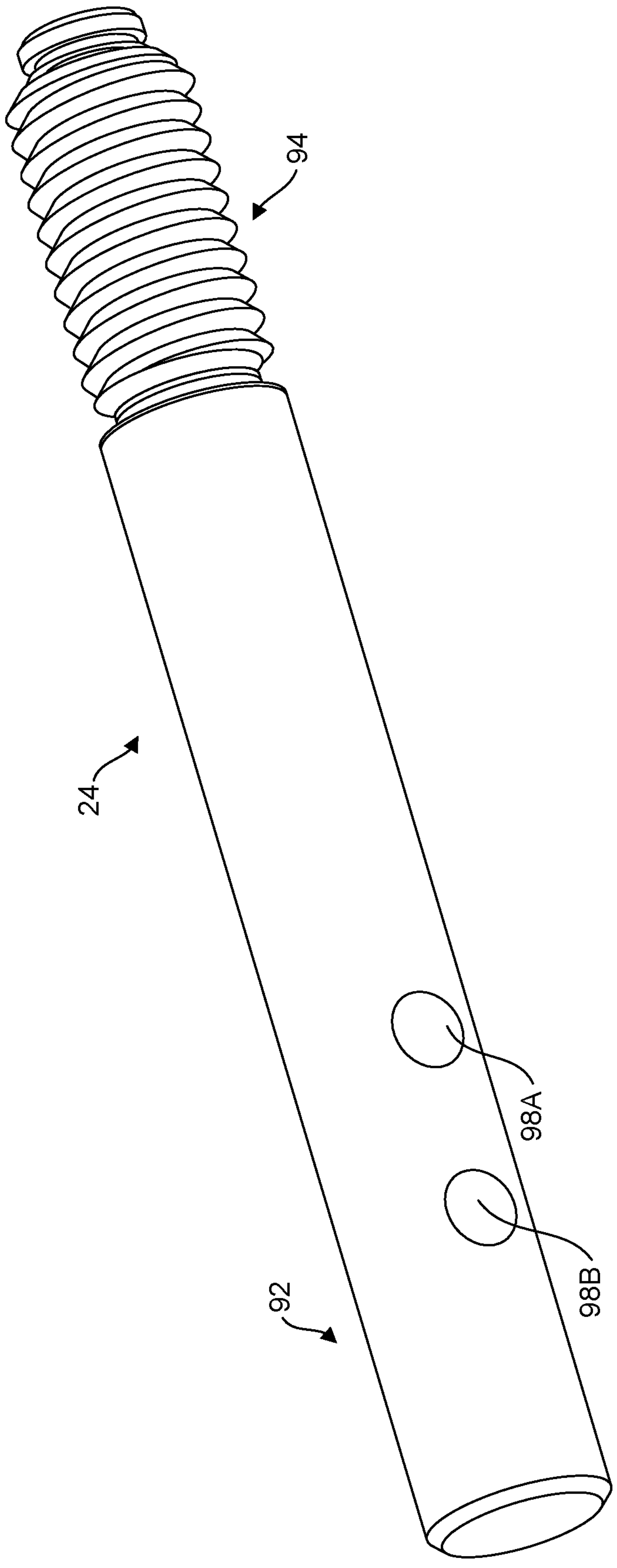
FIG. 10 is a perspective view of a non-limiting exemplary embodiment of a crank shaft for the winch of FIG. 1.

FIG. 10 is a perspective view of a non-limiting exemplary embodiment of the crank shaft 24 having first and second ends or sections 92 and 94, respectively. In some embodiments, the crank shaft 24 and the crank spool 20 are configured for being coupled or attached or connected to each other such that the rotation of one, i.e., crank spool 20 or crank shaft 24, induces the other to also rotate. In certain embodiments, the crank spool 20 includes connection points 96A and 96B in the cylindrical section 72 thereof, and the crank shaft 24 includes connection points 98A and 98B in the first end 92 thereof. In some embodiments, the cylindrical section 72 of the crank spool includes a passage or opening 100 configured for receiving or housing at least a portion of the first end 92 of the crank shaft 24.

In certain embodiments, the connection points 96A and 96B extend through a wall 102 of the cylindrical section 72 of the crank spool 20. In other words, the connection points 96A and 96B extend from an outer surface 104 into the passage 100 of the cylindrical section 72 of the crank spool 20. In some embodiments, the cylindrical section 72 of the crank spool 20 includes additional connection points, such as for example directly opposite the connection points 96A and 96B, configured for extending a dowel or a pin through the passage 100. In certain embodiments, the crank spool 20 includes either only one or more than two connection points 96.

In some embodiments, the connection points 98A and 98B extend partly through the crank shaft 24. In certain embodiments, the connection points 98A and 98B extend through the crank shaft 24. In some embodiments, the crank shaft 24 includes either only one or more than two connection points 98.

In a non-limiting exemplary embodiment, the crank spool 20 and the crank shaft 24 are coupled or attached to each other by disposing or placing or extending at least a portion of the first end 92 of the crank shaft 24 within or through the passage 100 of the crank spool 20. In some embodiments, the one or more connection points 96 and 98 are aligned with each other, and a connector 106 extending through or into at least portions of connection points 96 and 98 couples the crank spool 20 and the crank shaft 24 to each other. A non-limiting exemplary embodiment of connector 106 is illustrated in FIG. 2 as connectors 106A and 106B. In some embodiments, the number of connectors 106 correspond to the number of connection points 96 and 98.

The above described manner of coupling together the crank spool 20 and the crank shaft 24 should not be considered a requirement or limiting. All alternative configurations of the first end 92 of crank shaft 24 and the passage 100 in the crank spool 20 that are known or become known to a person of ordinary skills are considered as being within the meets and bounds of the instant disclosure. Also, all alternative manners of coupling or attaching the first end 92 of crank shaft 24 and the passage 100 in the crank spool 20 with each other that are known or become known to a person of ordinary skills are considered as being within the meets and bounds of the instant disclosure.

In a non-limiting exemplary embodiment, the crank spool 20 and the crank shaft 24 may be formed as a unitary component. In another non-limiting exemplary embodiment a keyed joint is used for coupling or attaching the crank spool 20 and the crank shaft 24 to each other.

It should be clearly understood that while one or more of the figures may illustrate and/or the description of the instant disclosure may imply one or more specific configurations and/or geometries, this should not be construed as a limitation or a requirement. Any one or more means for coupling or attaching the crank spool 20 and the crank shaft 24 to each other, as may be known or become known to a person of ordinary skills, are considered as being within the metes and bound of the instant disclosure. For instance, the one or more connectors 106 may be any one or more of a dowel, a pin, a screw, a nut and bolt, a keyed joint, a slotted joint, among others. In a non-limiting exemplary embodiment, one or more of the connection points 96 and/or 98 have complimentary configurations and/or geometries. As such, the connector 106 will have a configuration and/or geometry that corresponds to or complements that of one or both connection points 96 and 98. For instance, in some embodiments, the connection point 96A may be circular and the connection point 98A may be a polygon, then the connector 106A will have both a circular section and a polygon section, wherein the circular section of the connector 106A will complement or correspond to the circular shape of the connection point 96A and the polygon section of the connector 106A will complement or correspond to the polygon shape of the connection point 96B.

In a non-limiting exemplary embodiment, the second end or section 94 of the crank shaft 24 is threaded. However, as will described infra, this should not be construed as a requirement or a limitation.

Figure 11A:
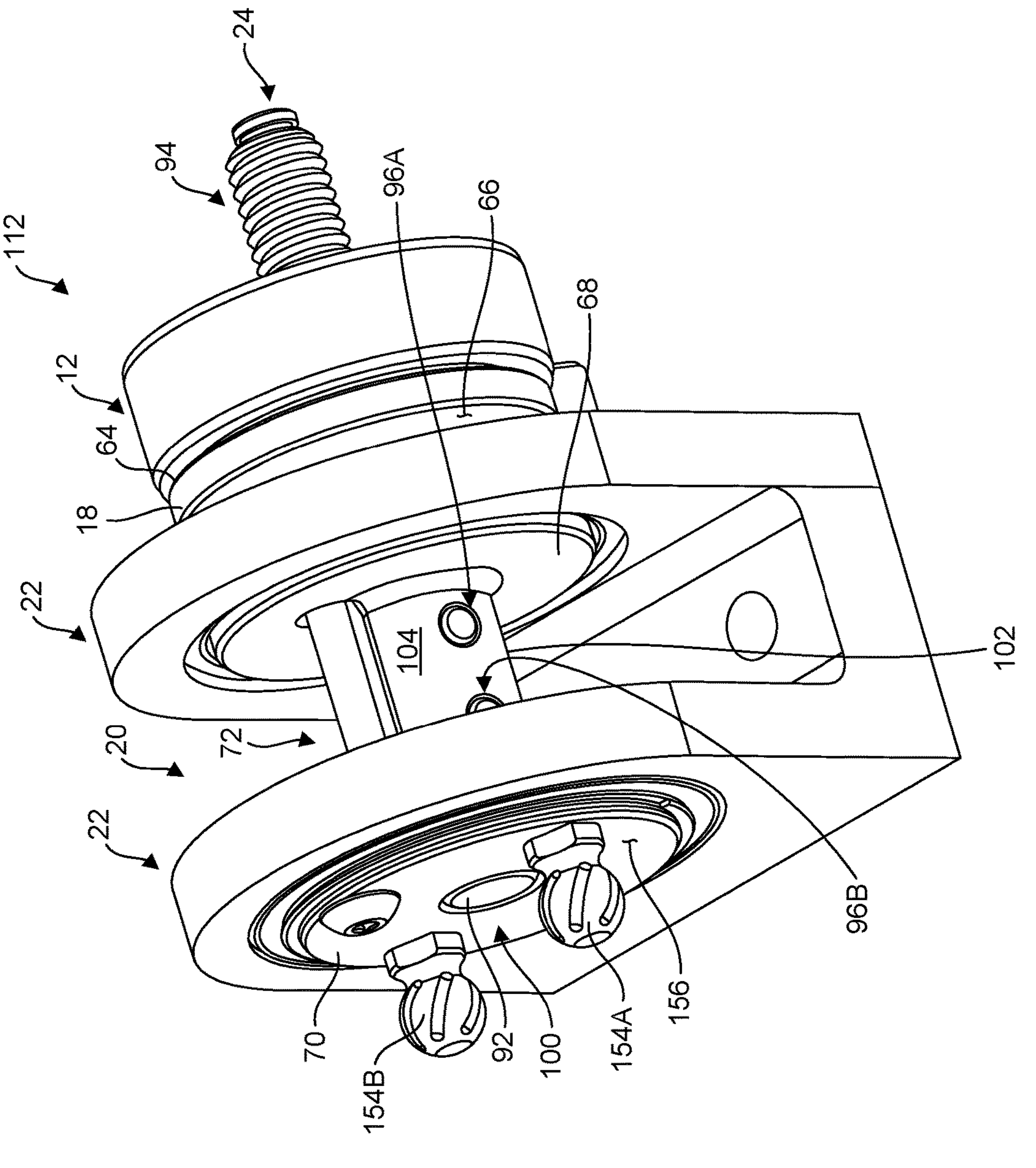
FIG. 11A illustrates a non-limiting exemplary embodiment of a sub-assembly for the winch of FIG. 1 having the one way bearing, the bearing hub, the friction disk, the crank spool, the crank housing, and the crank shaft in an assembled state.
Figure 11B:
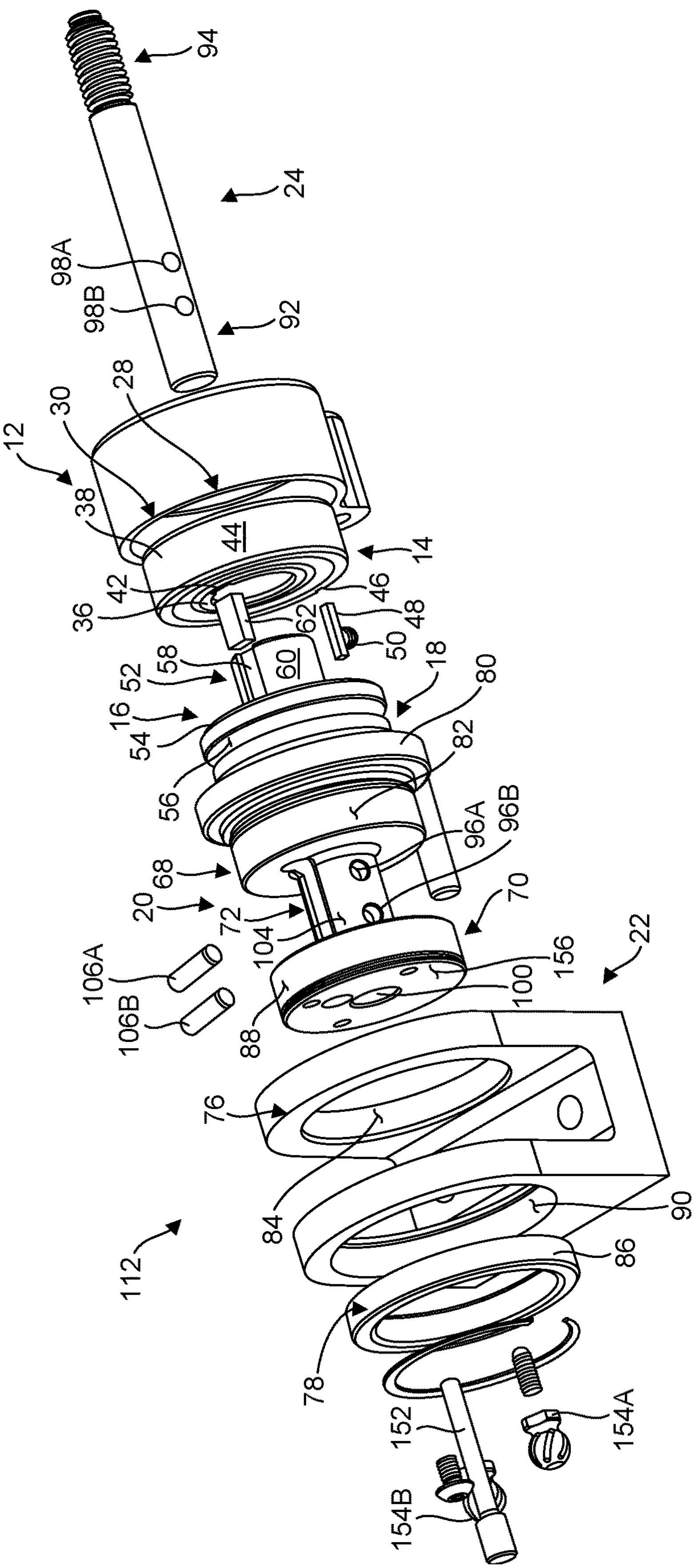
FIG. 11B illustrates the sub-assembly of FIG. 11A in a pre-assembled arrangement.

FIG. 11A is a perspective view illustrating a sub-assembly 112 of the winch 10 in a semi-assembled configuration, and FIG. 11B illustrates a pre-assembled arrangement of the portion of the winch 10 shown in FIG. 11A. The assembly of the components illustrated in FIGS. 11A and 11B is relatively simple and straight forward as has been sectionally described supra. In a non-limiting exemplary embodiment, the bearing housing 12 and the one way bearing 14 are assembled as described supra. The one way bearing 14 and the bearing hub 16 are assembled as described supra forming a sub-assembly 112 of the bearing housing 12, the one way bearing 14, and the bearing hub 16. The first surface 64 of the friction disk 18 is placed adjacent to or abutting the outer surface 56 of the disk 54 of the bearing hub 16 as described supra forming a sub-assembly 112 of the bearing housing 12, the one way bearing 14, the bearing hub 16, and the friction disk 18. The outer surface 74 of the first disk 68 of the crank spool 20 is placed adjacent to or abutting the second surface 66 of the friction disk 18 as described supra forming a sub-assembly 112 of the bearing housing 12, the one way bearing 14, the bearing hub 16, the friction disk 18, and the crank spool 20. The first and second crank bearings 80 and 86 are placed or disposed on or around the first and second disks 68 and 70, respectively, of the crank spool 20 as described supra forming a sub-assembly 112 of the bearing housing 12, the one way bearing 14, the bearing hub 16, the friction disk 18, the crank spool 20, and the first and second crank bearing 80 and 86. The crank spool 20 having the first and second crank bearing 80 and 86 around the first and second disks 68 and 70, respectively, and the crank housing 22 are assembled as described supra forming a sub-assembly 112 of the bearing housing 12, the one way bearing 14, the bearing hub 16, the friction disk 18, the crank spool 20, first and second crank bearings 80 and 86, and the crank housing 22.

The crank shaft 24, starting with the first end 92, is extended through the bearing hub 16, the friction disk 18, and into the cylindrical section 72 of the crank spool 20. The crank spool 20 and the crank shaft 24 are coupled or attached to each other as described supra forming a sub-assembly 112 of the bearing housing 12, the one way bearing 14, the bearing hub 16, the friction disk 18, the crank spool 20, the crank housing 22, and the crank shaft 24. The bearing housing 12 and the crank housing 22 are coupled or attached to each other ensuring the sub-assembly 112 remains intact, i.e., does not dis-assemble.

The sub-assembly 112 illustrated in FIG. 11A and as described supra, composed of at least the bearing housing 12, the one way bearing 14, the bearing hub 16, the friction disk 18, the crank spool 20, first and second crank bearings 80 and 86, the crank housing 22, and the crank shaft 24, is a substantial portion of the fully-assembled winch 10. In other words, the sub-assembly 112 illustrated in FIG. 11A and as described supra, essentially is the winch 10 without a means, e.g., a crank handle, for rotating the crank shaft 24.

Notwithstanding, the sub-assembly 112 illustrated in FIG. 11A and as described supra, is operational or functional in accordance with a non-limiting exemplary embodiment of the instant disclosure. For instance, rotating the crank shaft 24 in a first direction, e.g., manually, will rotate the crank spool 20 in the same direction. And, the one way bearing 14 will inhibit the crank spool 20 and the crank shaft 24 from rotating in a second direction opposite the first direction.

The above described components for the winch sub-assembly 112 or the winch 10 and/or the manner in which they are assembled or coupled or attached to make the winch sub-assembly 112 illustrated in FIGS. 11A and 11B should not be considered limiting or a requirement. All alternative components for the winch sub-assembly 112 or the winch 10 that are known or become known to a person of ordinary skills are considered as being within the metes and bounds of the instant disclosure. Also, all alternative manners of assembling the above described components and/or alternative components to create the winch sub-assembly 112 or the winch 10 that are known or become known to a person of ordinary skills are considered as being within the metes and bounds of the instant disclosure.

Figure 12A:
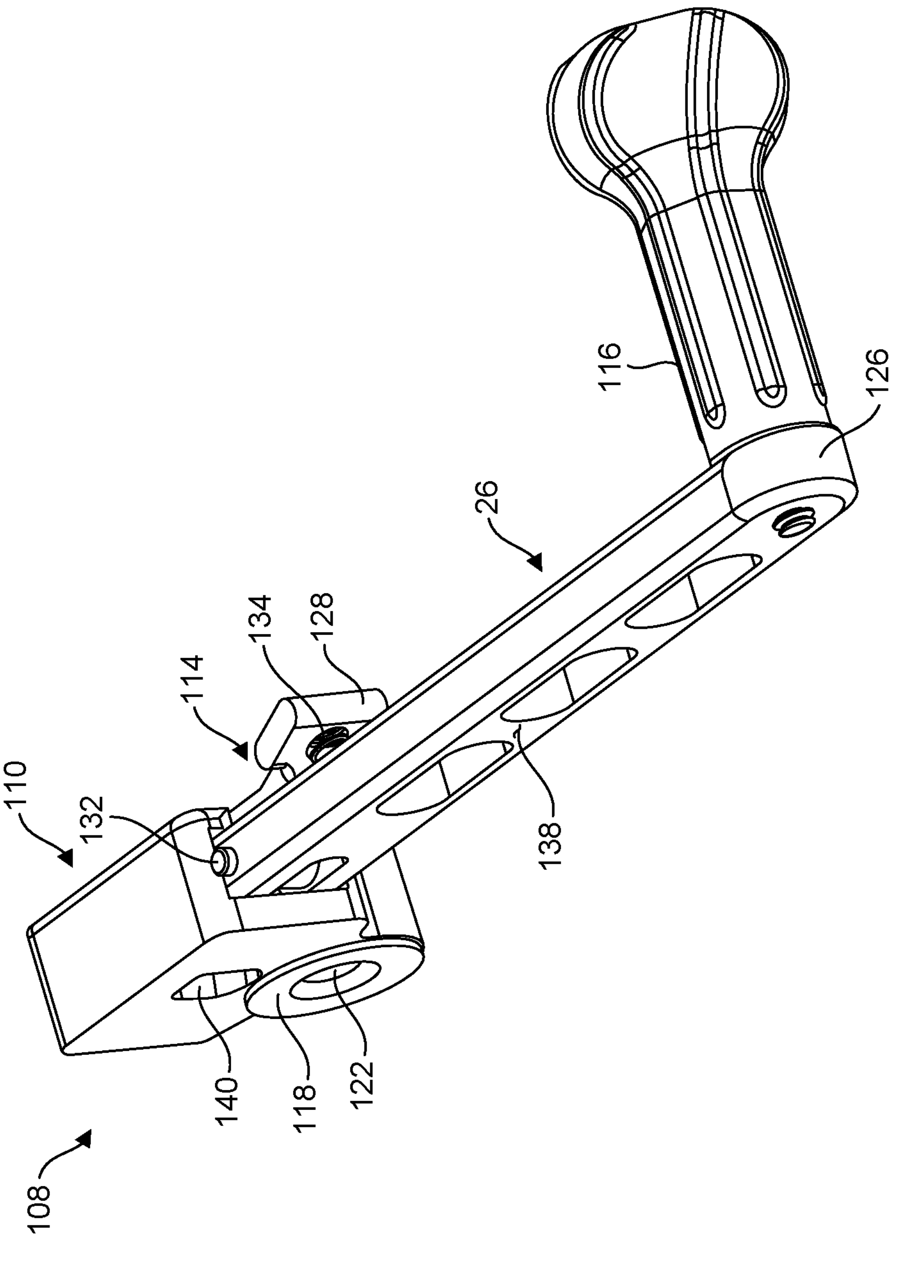
FIGS. 12A and 12B are perspective views of a non-limiting exemplary embodiment of a crank mechanism for the winch of FIG. 1 as viewed from opposite sides.
Figure 12B:
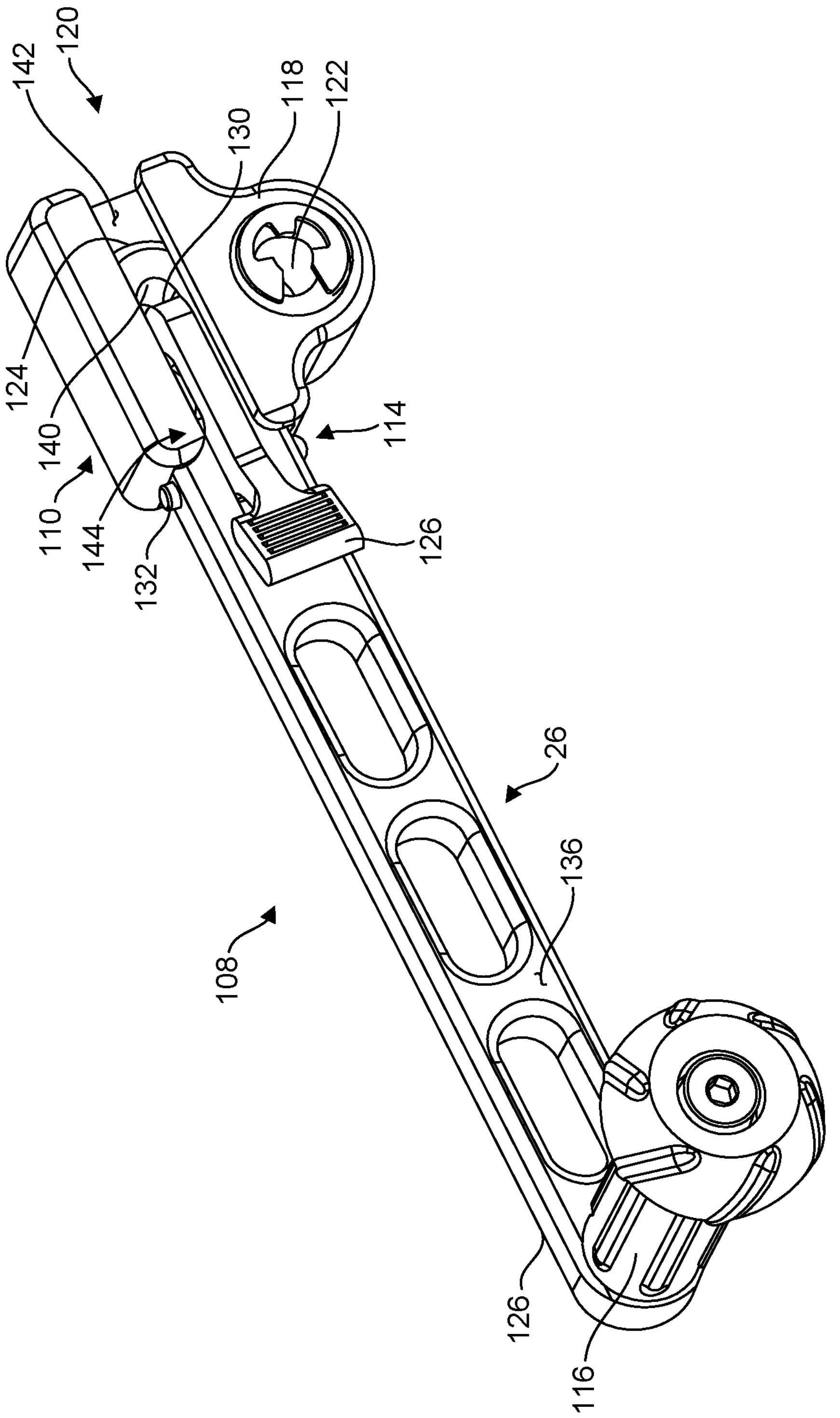
Figure 12C:
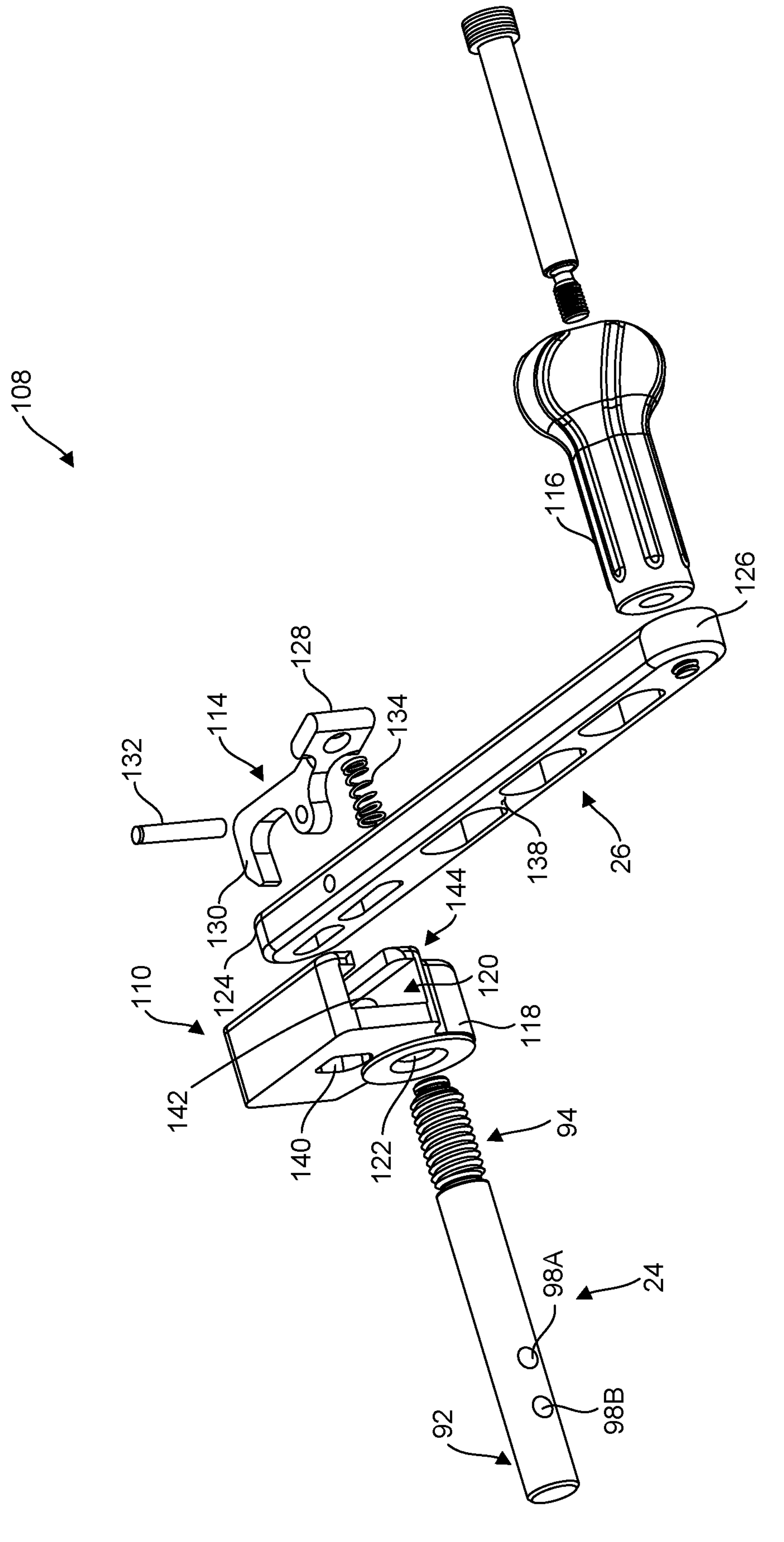
FIGS. 12C and 12D, respectively, illustrate the crank mechanism of FIGS. 12A and 12B in a pre-assembled arrangement.
Figure 12D:
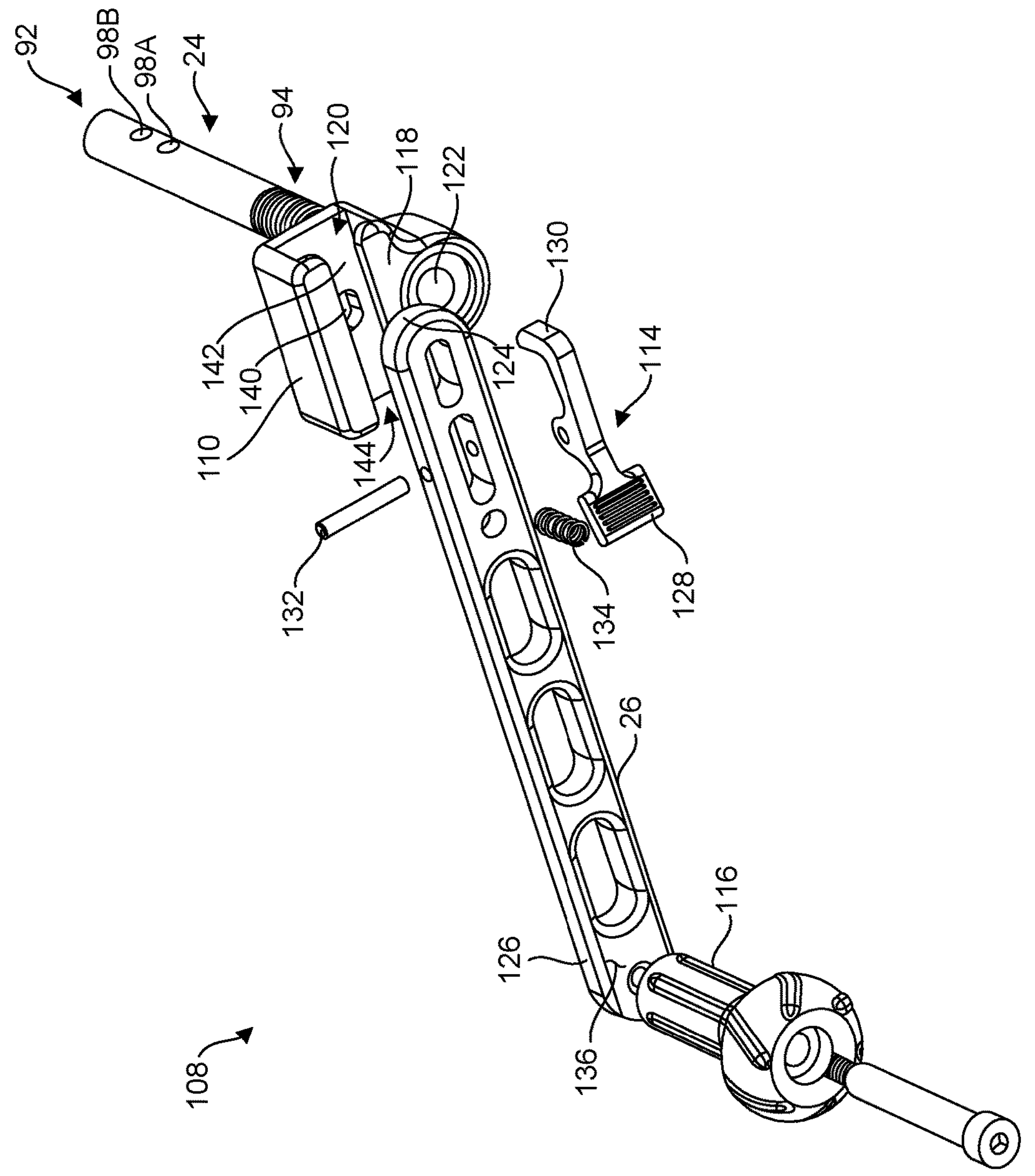

FIGS. 12A and 12B are perspective views of a non-limiting exemplary embodiment of a crank mechanism 108 for the winch 10 as viewed from opposite sides; and FIGS. 12C and 12D, respectively, illustrate the crank mechanism 108 in a pre-assembled arrangement. In some embodiments, the crank mechanism includes a handle mount 110, a crank handle 26, a handle lock/release lever 114, and a hand grip 116.

Figure 13A:
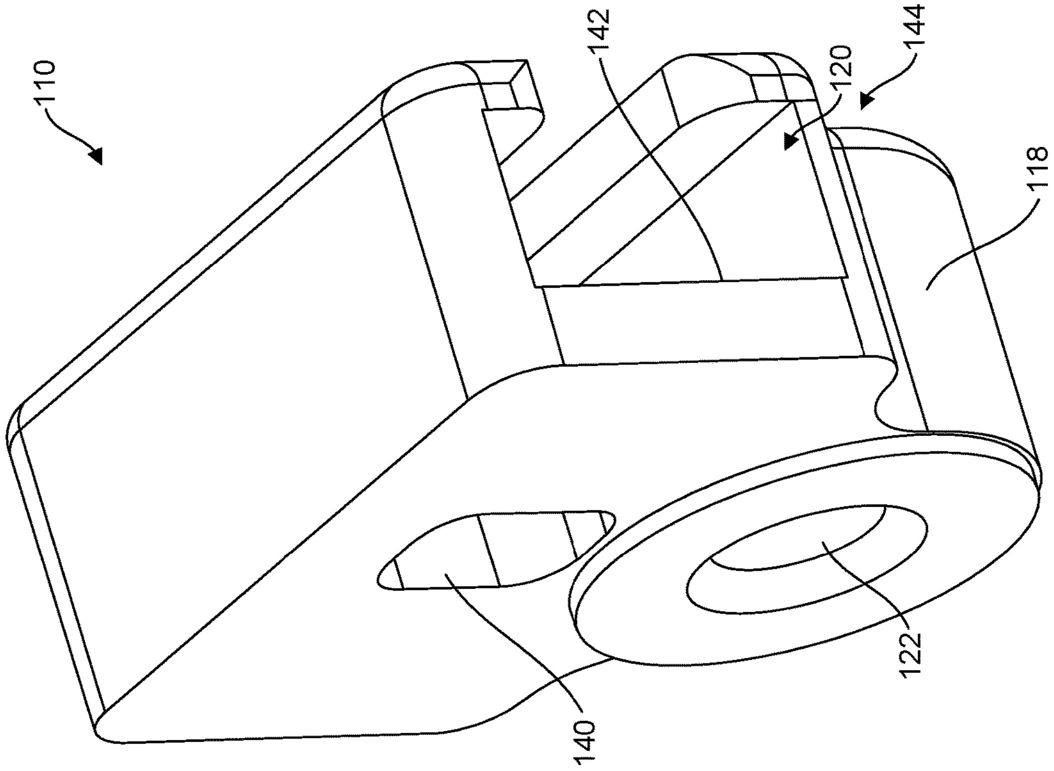
FIGS. 13A and 13B are perspective views of a non-limiting exemplary embodiment of a handle mount for the winch of FIG. 1 as viewed from opposite sides.
Figure 13B:
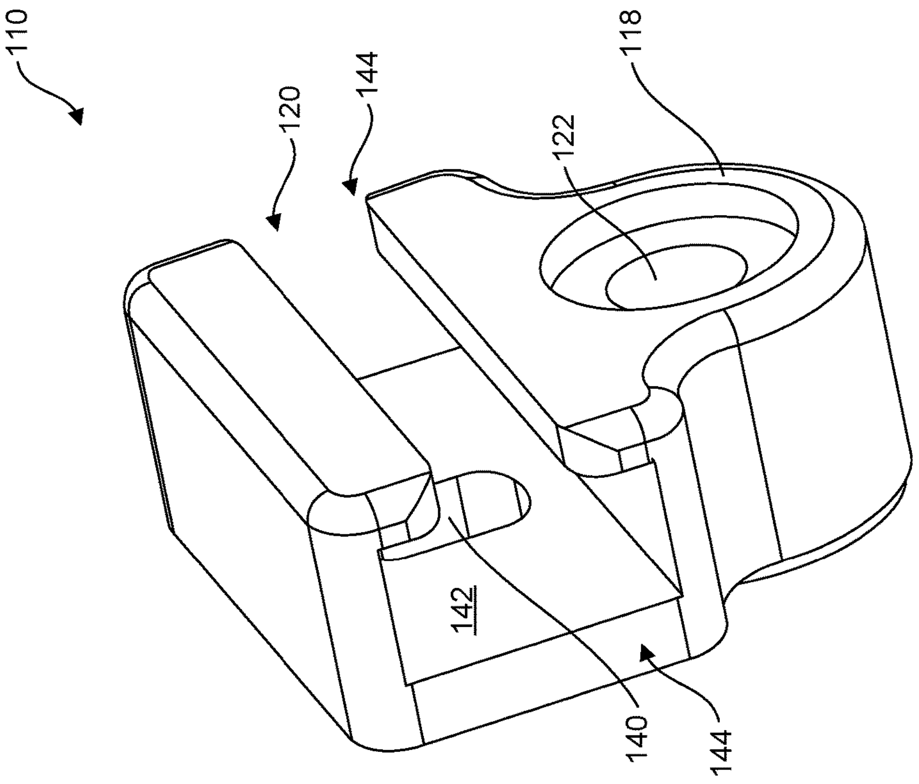
Figure 13C:
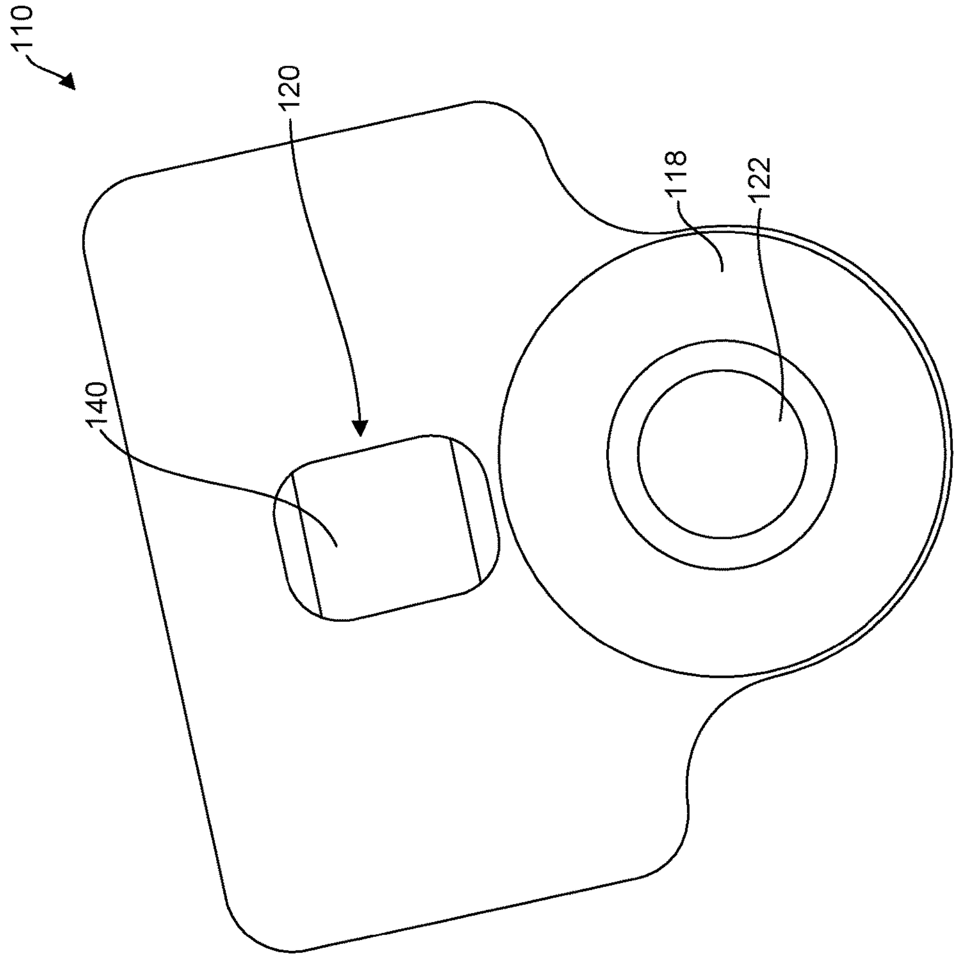
FIGS. 13C and 13D, respectively, are side views of the handle mount illustrated in FIGS. 13A and 13B.
Figure 13D:
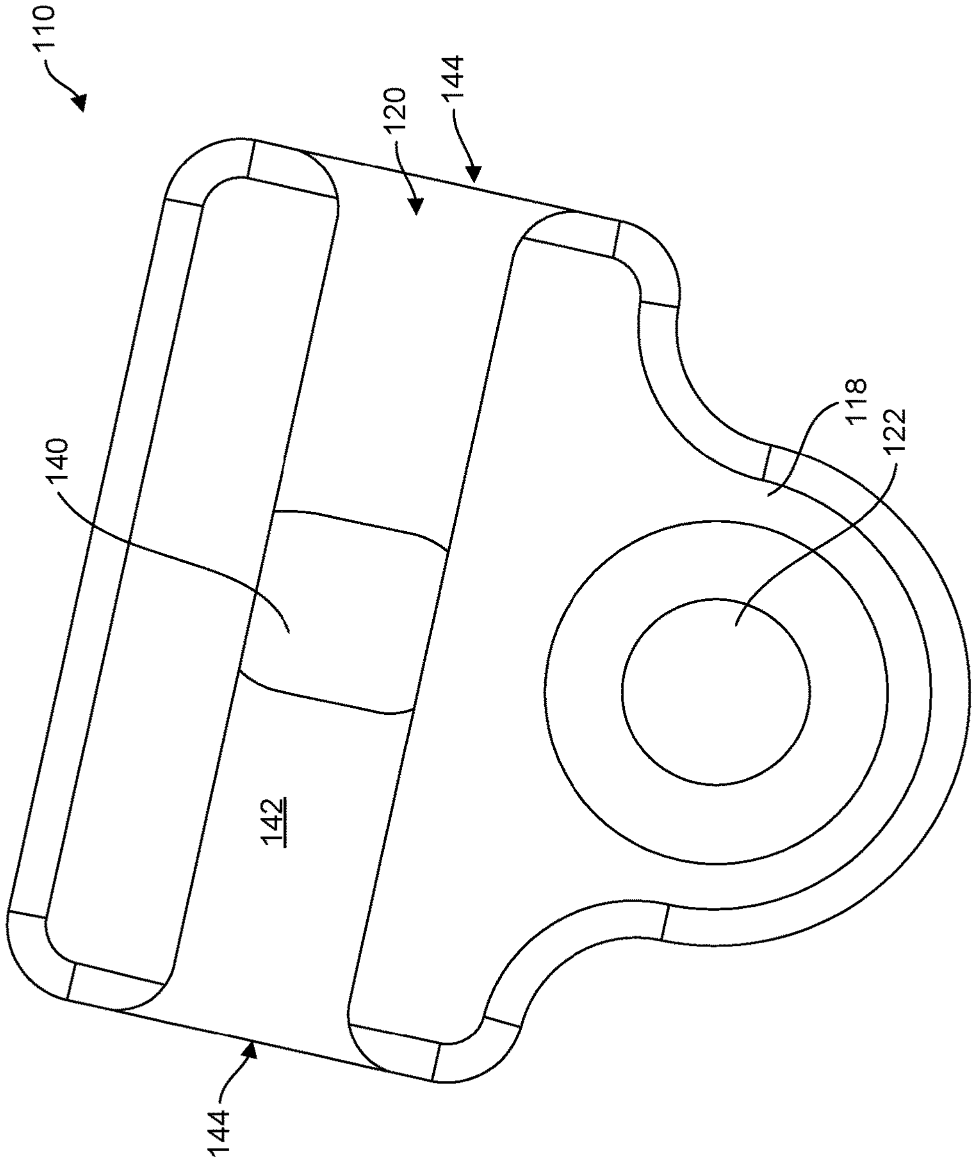
Figure 13E:
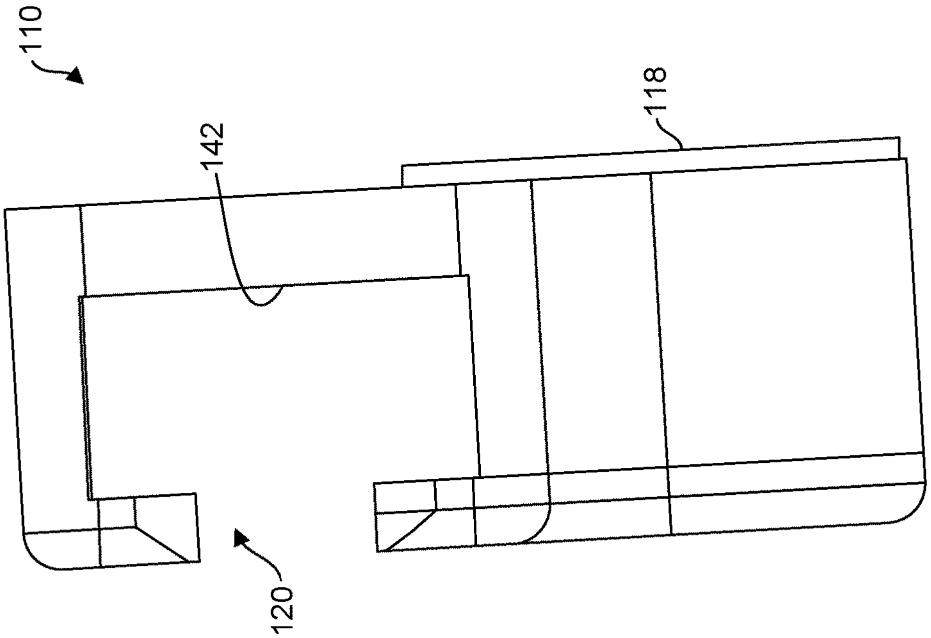
FIG. 13E is an end view of the handle mount illustrated in FIGS. 13A-13D.

FIGS. 13A and 13B are perspective views of a non-limiting exemplary embodiment of the handle mount 110 as viewed from opposite sides; FIGS. 13C and 13D, respectively, are side views of the handle mount 110 corresponding to FIGS. 13A and 13B; and FIG. 13E is an end view of the handle mount 110 illustrated in FIGS. 13A-13D.

Figure 14A:
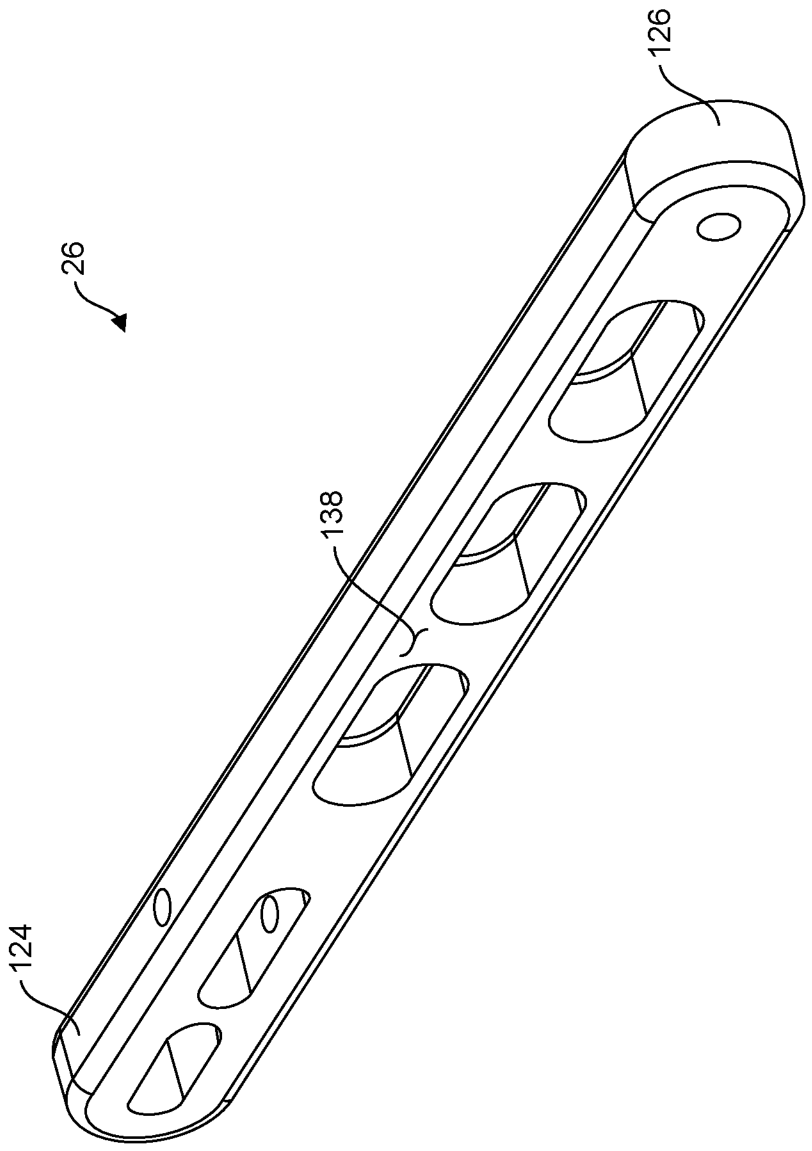
FIG. 14A is a perspective view of a non-limiting exemplary embodiment of a crank handle for the winch of FIG. 1.
Figure 14B:
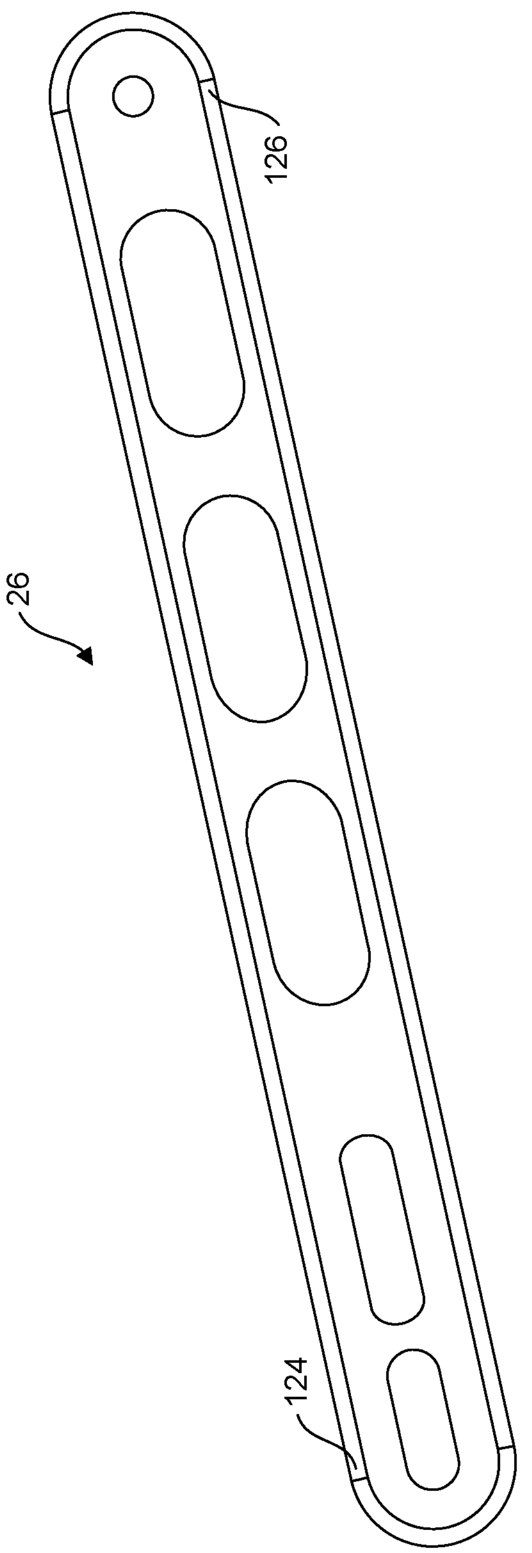
FIG. 14B is a side view of the crank handle illustrated in FIG. 14A.

FIGS. 14A and 14B, respectively, are a perspective view and a side view of a non-limiting exemplary embodiment of the crank handle 26.

In some embodiments, the handle mount 110 includes an attachment section 118 and a channel 120. In certain embodiments, the attachment section 118 is configured for coupling or attaching the handle mount 110 and the crank shaft 24 to each other. Accordingly, in some embodiments, the attachment section 118 includes a threaded opening 122 for attaching or coupling the handle mount 110 and the threaded second end or section 94 of the crank shaft 24. However, a threaded coupling should not be considered as a requirement or a limitation. Alternate configurations for attaching or coupling the crank shaft 24 and the handle mount 110 to each other that are known or become known to a person of ordinary skills are considered as being within the metes and bounds of the instant disclosure.

In some embodiments, the crank handle 26 extends between first and second ends 124 and 126, respectively. In certain embodiments, at least a portion of the first end 124 and at least a portion of the channel 120 in the handle mount 110 are configured for being coupled or attached to each other. For instance, in some embodiments, the channel 120 is configured for slidingly receiving the first end 124 of the crank handle 26.

In certain embodiments, the handle lock/release lever 114 includes a thumb (or finger) pad 128 and a hook or similar structure 130. In some embodiments, the crank handle 26 and the handle lock/release lever 114 are configured for coupling or attachment to each other proximate the first end 124 of the crank handle 26. In certain embodiments, the crank handle 26 and the handle lock/release lever 114 are pivotally coupled or attached to each other with a dowel or pin 132. However, this should not be considered as a requirement or a limitation. Any mechanism for pivotally coupling the crank handle 26 and the handle lock/release lever 114 to each other that are known or become known to a person of ordinary skills are considered as being within the metes and bounds of the instant disclosure.

In certain embodiments, a biasing element 134, such as for example a spring, pivotally biases the crank handle 26 and the thumb pad 128 away from each other on a first side 136 of the crank handle 26. It should be clearly understood that any form or type of a biasing element that are known or become known to a person of ordinary skills are considered as being within the metes and bounds of the instant disclosure.

In a non-limiting exemplary embodiment, the crank handle 26 and the handle lock/release lever 114 are configured such that when they are pivotally coupled and the crank handle 26 and the thumb pad 128 are biased away from each other on the first side 136 of the crank handle 26, the hook 130 extends beyond or protrudes away from a second side 138 of the crank handle 26 proximate the first end 124 of the crank handle 26. In some embodiments, the handle mount 110 includes an opening 140 in a wall 142 of the channel 120. In certain embodiments, the opening 140 is configured for receiving or housing or latching or coupling with at least a portion of the hook 130.

In a non-limiting exemplary embodiment, the first end 124 of the crank handle 26 with the protruding portion of the hook 130 are inserted into the channel 120 through an opening 144, and slid into the channel 120. In some embodiments, the handle lock/release lever 114 pivots the protruded portion of the hook 130 away from the wall 142 of the channel 120 and pivots the thumb pad 128 towards the first side 136 of the crank handle 26. As the crank handle 26 continues to slide into the channel 120, and when the retracted portion of the hook 130 reaches the opening 140 in the wall 142, the biasing element 134 displaces the thumb pad 128 away from the first side 136 of the handle 26 such that at least a portion of the hook 130 protrudes or extends away from the second side 138 of the crank handle 26 and latches with the opening 140 on the wall 142 of the channel 120. Thereafter, while the biasing element 134 keeps the thumb pad 128 displaced away from the first side 136 of the handle 26, the coupling between the hook 130 and the opening 140 couples or attaches the handle mount 110 and the crank handle 26 to each other, and inhibits their separation. For separating the handle mount 110 and the crank handle 26 from each other, i.e., for removing the crank handle 26 from the handle mount 110, the user depresses the thumb pad 128 towards the first side 136 of the crank handle 26, which in turn extracts the hook 130 out of the opening 140 in the wall 142, and slides the first end 124 of the crank handle 26 out of the channel 120.

In a non-limiting exemplary embodiment, the channel 120 is open at both ends. In some embodiments, handle mount 110 and the crank handle 26 can be coupled with each other by sliding the first end 136 of the crank handle 26 into the channel 120 from either opening.

In a non-limiting exemplary embodiment, the hand grip 116 is rotatably coupled with the crank handle 26 proximate the second end 138 thereof.

The above described components for the crank mechanism 108 and/or the manner in which they are assembled or coupled or attached to make the crank mechanism 108 illustrated in FIGS. 12A and 12B should not be considered limiting and/or a requirement. All alternative components for the crank mechanism 108 that are known or become known to a person of ordinary skills are considered as being within the metes and bounds of the instant disclosure. Also, all alternative manners of assembling the above described components and/or alternative components to create the crank mechanism 108 that are known or become known to a person of ordinary skills are considered as being within the metes and bounds of the instant disclosure.

In view of the foregoing, it should be readily apparent that the winch 10 results from assembling or coupling or attaching together the winch sub-assembly 112 illustrated in FIG. 11A and the crank mechanism 108 illustrated in FIGS. 12A and 12B. More specifically, the winch 10 results from assembling or coupling or attaching together the second end 94 of the crank shaft 24 protruding or extending from the winch sub-assembly 112 illustrated in FIG. 11A and the opening 122 in the crank mechanism 108 illustrated in FIGS. 12A and 12B.

The above described components for the winch 10 and/or the manner in which they are assembled or coupled or attached to make the winch 10 should not be considered limiting or a requirement. All alternative components for the winch 10 that are known or become known to a person of ordinary skills are considered as being within the metes and bounds of the instant disclosure. Also, all alternative manners of assembling the above described components and/or alternative components to create the winch 10 that are known or become known to a person of ordinary skills are considered as being within the metes and bounds of the instant disclosure.

In a non-limiting exemplary embodiment, the handle mount 110 and the crank handle 26 are configured as a unitary component. In another non-limiting exemplary embodiment, the second end 94 of the crank shaft 24 and the first end 124 of the crank handle 26 are configured for coupling with each other, in which case the handle mount 110 may not be required. In some embodiments, the second end 94 of the crank shaft 24 and the first end 124 of the crank handle 26 have complementary threads. However, this should not be considered a requirement or limiting. All alternative manners of attaching or coupling together the crank shaft 24 and the crank handle 26 that are known or become known to a person of ordinary skills are considered as being within the metes and bounds of the instant disclosure. For example, the coupling may be a keyed joint or a slotted joint, among others.

While the crank shaft 24 is illustrated as substantially circular or cylindrical, this should not be construed as a requirement or a limitation. All alternative shapes, designs, etc., that are known or become known to a person of ordinary skills are considered as being within the metes and bounds of the instant disclosure. For example, in a non-limiting exemplary embodiment, the crank shaft 24 may have a polygonal profile, and therefore the components or passages through which the crank shaft 24 extends will be configured similarly so that the crank shaft 24 does not "slip" when rotated.

Figure 15A:
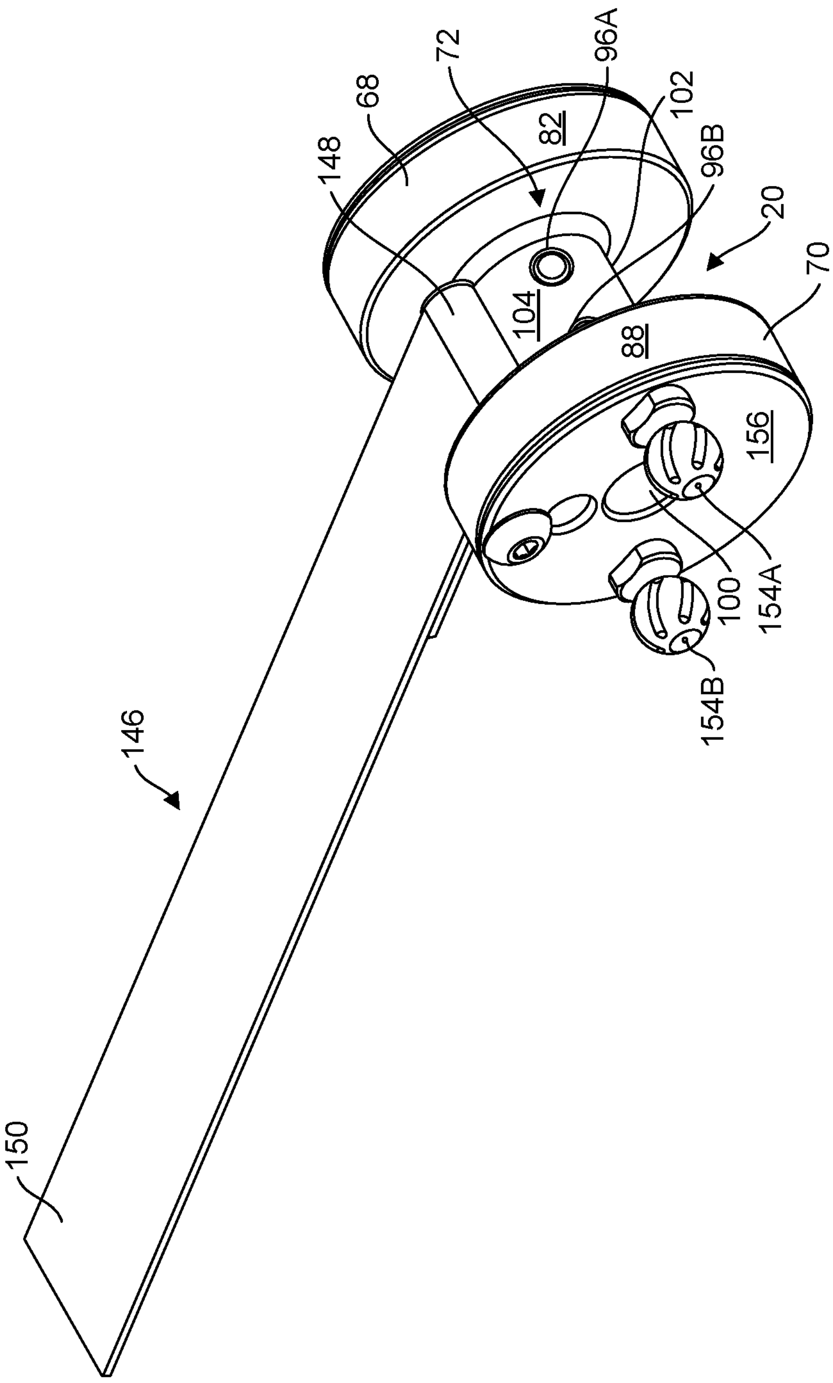
FIGS. 15A and 15B are perspective views of a non-limiting exemplary embodiment illustrating a non-limiting exemplary embodiment of a strap attached to a non-limiting exemplary embodiment of a crank spool of the instant disclosure.
Figure 15B:
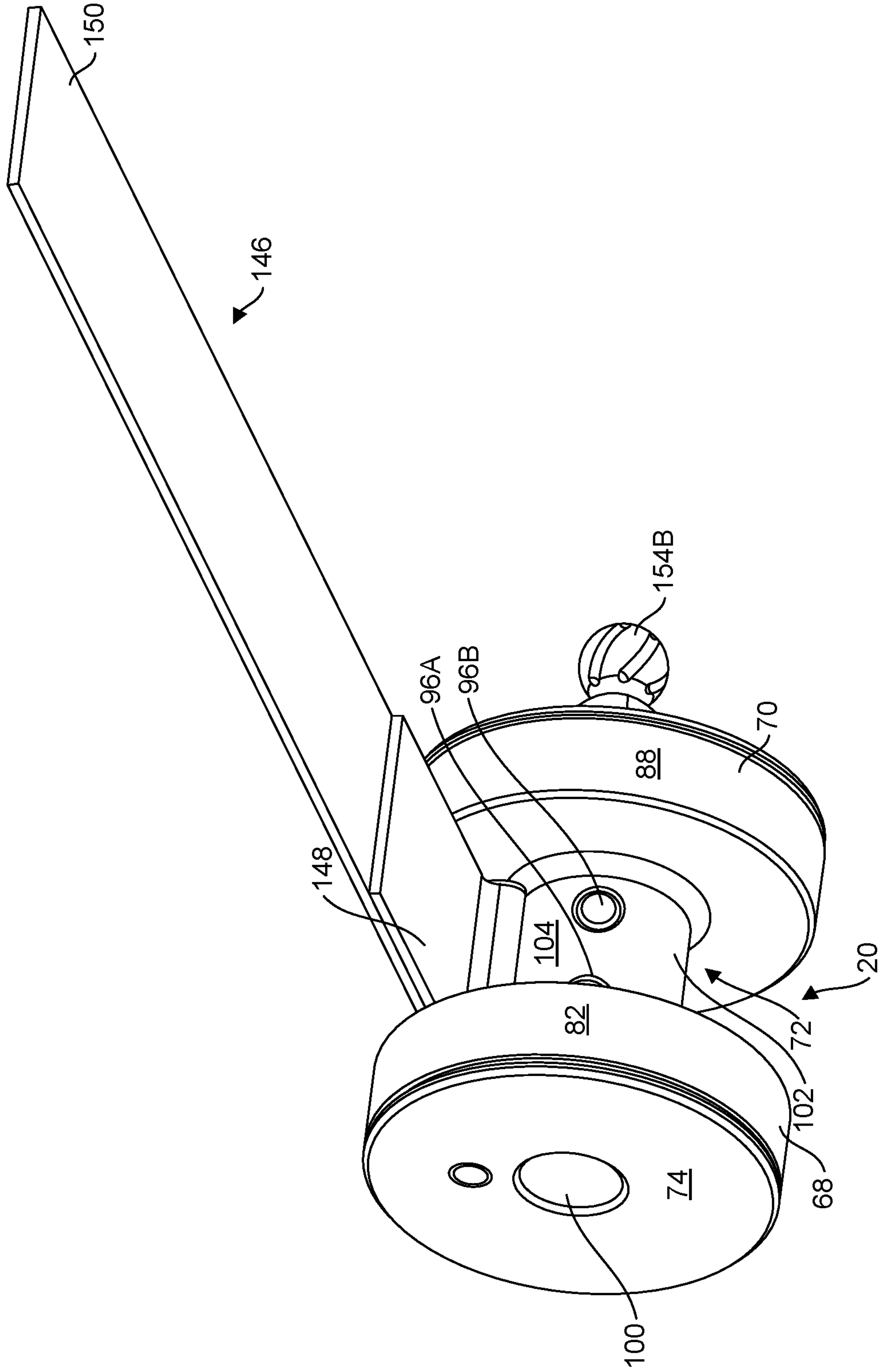

In a non-limiting exemplary embodiment, the winch 10 is used for pulling and releasing a load. Accordingly, a strap 146, or something similar, having a first and a second end 148 and 150, respectively, is provided for this purpose. The second end 150 of the strap 146 is configured for attaching the load. FIG. 15 In some embodiments, the first end 148 of the strap 146 is attached to the crank spool 20 such that the strap 146 winds on or unwinds from the cylindrical section 72 of the crank spool 20 when the crank spool 20 is rotated. In certain embodiments, the first end 148 of the strap 146 is attached to the cylindrical section 72 of the crank spool 20. In some embodiments, a strap pin 152 extends through an opening in the first end 148 of the strap 146, and the opposite ends of the strap pin 152 are attached to the first and second disks 68 and 70 of the crank spool 20. All alternative configurations and manners of attaching the strap 146 to the crank spool 20 that are known or become known to a person of ordinary skill are considered as being within the metes and bounds of the instant disclosure.

The following is a non-limiting exemplary embodiment of the operation of the winch 10. With a load attached to the second end 150 of the strap 146, the hand grip 116 is used to rotate the crank mechanism 108 in a first direction for pulling the load. Since the crank shaft 24 and the crank mechanism 108 are threaded, the rotating crank mechanism 108 is linearly displaced towards the winch sub-assembly 112 until at least a portion of the handle mount 110 of the crank assembly 108 abuts or is adjacent to a portion of the cylindrical section 52 of the bearing hub 16 protruding from or extending out of the inner ring 36 of the one way bearing 14. Continued rotation of the crank mechanism 108 generates: (i) a first compressive force acting on the disk 54 of the bearing hub 12 and on the first surface 64 of the friction disk 18; and (ii) a second compressive force acting on the second surface 66 of the friction disk 18 and the outer surface 74 of the first disk 68 of the crank spool 20. In some embodiments, the first compressive force creates a substantially frictionless bond between the bearing hub 16 and the friction disk 18, and the second compressive force creates a substantially frictionless bond between the friction disk 18 and the crank spool 20. Thus, the combination of the first and second compressive forces, now referred to as the combined compressive force, creates a substantially frictionless bond between the bearing hub 16 and the crank spool 20. The continued rotation of the crank mechanism 108 in the first direction increases the combined compressive force, and the strap 146 winds or continues to wind on the crank spool 20 in the first direction, minimizes or eliminates any slack in the strap 146, pulls the load, and the strap 146 is subjected to tension.

As described above, at least a portion of the handle mount 110 of the crank mechanism 108 abuts or is adjacent to a portion of the cylindrical section 52 of the bearing hub 16 protruding from or extending out of the inner ring 36 of the one way bearing 14. Rotation of the crank mechanism 108 in the first direction will exert or induce a compressive force on the cylindrical section 52 of the bearing hub 16 protruding from or extending out of the inner ring 36 of the one way bearing 14. It should be noted that this compressive force acting on the protruding portion of the cylindrical section 52 is at least one of the forces contributing to the above described combined compressive force.

Now then, if the user stops rotating the crank mechanism 108 in the first direction and releases or "let's go of" the hand grip 116, the combined compressive force does not dissipate and continues to maintain the substantially frictionless bond between the bearing hub 16 and the crank spool 20, and the strap 146 remains under tension due to the load attached to the second end thereof. However, the crank spool 20 does not rotate in a second direction opposite the first direction and, therefore, the strap 146 does not unwind from the crank spool 20 and the load is held at substantially the same location as when the hand grip 116 was released. The rotation of the crank spool 20 in the second direction and the unwinding of the strap 146 is inhibited by the one way bearing 14, and more particularly by the inner ring 36 of the one way bearing 14. And, the load continues to be held at substantially the same location as when the hand grip 116 was released.

Now, to enable the crank spool 20 to rotate in the second direction and unwind the strap 146 therefrom, the user rotates the crank mechanism 108 in the second direction whereby the combined compressive force starts to decrease. The reduction in the combined compressive force induces or enables at least some slippage between the bearing hub 16 and the friction disk 16 and/or between the friction disk 18 and the crank spool 20, whereby the crank spool 20 can at least partially rotate in the second direction and at least a portion of the strap 146 can unwind from the crank spool 20. It should be noted that the combined compressive force never dissipates completely while the strap 146 is under tension due to the load at the second end 150 thereof. If the user were to release the hand grip 116 or stop rotating the crank mechanism 108 in the second direction while the strap 146 remains under tension due to load at the second end 150 thereof, the combined compressive force continues to maintain the substantially frictionless bond between the bearing hub 16 and the crank spool 20, and the one way bearing 14, and more particularly the inner ring 36 of the one way bearing 14, inhibits the crank spool 20 from rotating in the second direction and the strap 146 cannot unwind from the crank spool 20. In a non-limiting exemplary embodiment, if there is slippage due to a partial reduction in the combined compressive force, the tension on the strap 146 will attempt to rotate the crank spool 20, and the crank shaft 24, in the second direction. However, any such rotation in the second direction will cause the second end 94 of the crank shaft 24 to "thread into" the handle mount 110 abutting or adjacent to the cylindrical section 52 of the bearing hub 16 that protrudes from or extends out of the inner ring 36 of the one way bearing 14. This then ensures that the combined compressive force maintains the substantially frictionless bond between the bearing hub 16 and the crank spool 20, and the one way bearing 14 will engage or "assert itself" or "kick-in" to inhibit further rotation of the crank spool 20 in the second direction and the unwinding of the strap 146.

When the strap 146 is not under tension such as when there is no load at the second end 150 of the strap 146, any portion of the strap 146 still wound on the cranks spool 20 cannot be unwound by simply pulling on the strap 146 because the one way bearing 14 will inhibit the crank spool 20 from rotating in the second direction. In other words, the one way bearing 14, and more particularly the inner ring 36 of the one way bearing 14, will inhibit "free wheeling" the strap 146 from the crank spool 20. In a non-limiting exemplary embodiment, the winch 10 includes one or more knobs or anchors 154A and 154B on an outer surface 156 of the second disk 70 of the crank spool 20. When the strap 146 needs to be removed, i.e., "free wheeled" from the crank spool 20, the user grabs and holds on to the one or more of the knobs 154 with one hand and rotates the crank mechanism 108 in the second direction. Grabbing and holding the one or more knobs 154 while rotating the crank mechanism 108 in the second direction inhibits or prevents the crank spool 20, and the crank shaft 24, from also rotating and enables the crank mechanism 108 to decouple, e.g., unthread, from the second end 94 of the crank shaft 24. As the crank mechanism 108 unwinds, the portion of the handle mount 110 of the crank mechanism 108 abutting the cylindrical section 52 of the bearing hub 16 protruding from the inner ring 36 of the one way bearing 14 separate from each other. Accordingly, the compressive force acting on the portion of the cylindrical section 52 of the bearing hub 16 protruding from the inner ring 36 of the one way bearing 14 decreases substantially and/or dissipates. Consequently, the combined compressive force also decreases substantially and/or dissipates, and the crank spool 20 can be rotated freely in the second direction without hinderance or interference from the one way bearing 14. The user can simply grab the strap 146 and "free wheel" it from the crank spool 20.

While there may be several instances or applications for using the winch 10, one known application is for cocking a crossbow. In a non-limiting exemplary embodiment, the winch 10 is mounted on a crossbow and the second end 150 of the strap 146 is attached to the bowstring which is not cocked or drawn. The crank mechanism 108 is rotated in the first direction which causes the strap 146 to wind onto the cranks spool 20 and pull or draw the bowstring towards the butt of the crossbow for cocking. When the bowstring is fully drawn, it is attached to and held by the trigger mechanism of the crossbow. The user then detaches the second end 150 of the strap 146 from the cocked bowstring, and the crossbow made ready for firing. It should be noted that in this particular application, and in sharp contrast to the crossbow winchs known in the art, the user can stop rotating the crank mechanism 108 and pulling the bowstring at any time, and the partially drawn bowstring will be held at the location it was at when the user stopped rotating the crank mechanism 108.

In a non-limiting exemplary embodiment, the friction disk 18 is configured for a substantially frictionless interface between the bearing hub 16 and the crank spool 20. In particular, the friction disk 18 is configured for a substantially frictionless interface between the outer surface 56 of the disk 54 of the bearing hub 16 and the first surface 64 of the friction disk 18; and also for a substantially frictionless interface between the second surface 66 of the friction disk 18 and the outer surface 74 of the first disk 68 of the crank spool 20. Accordingly, in some embodiments, rotation of the crank spool 20 in a first direction will cause the friction disk 18, the bearing hub 16, and the inner ring 36 of the one way bearing 14 to rotate in the first direction; and rotation of the crank spool 20 in a second direction opposite the first direction will be inhibited by the one way bearing 14, i.e., the inner ring 36 will inhibit rotation of the crank spool 20 in the second direction as described supra.

In another non-limiting exemplary embodiment, the winch 10 does not include the friction disk 18. Accordingly, the outer surface 56 of the disk 54 of the bearing hub 16 and the outer surface 74 of the first disk 68 of the crank spool 20 are configured for providing a substantially frictionless interface therebetween. Accordingly, in some embodiments, rotation of the crank spool 20 in a first direction will cause the bearing hub 16 and the inner ring 36 of the one way bearing 14 to rotate in the first direction; and rotation of the crank spool 20 in a second direction opposite the first direction will be inhibited by the one way bearing 14, i.e., the inner ring 36 will inhibit rotation of the crank spool 20 in the second direction as described supra.

In yet another non-limiting exemplary embodiment, the friction disk 18 is configured for enabling a substantially frictionless rotational interface with adjacent or abutting components at one or both opposing surfaces, i.e., first and second surfaces, 64 and 66 in a first direction; and the friction disk 18 is configured for at least partially inhibiting rotation in a second direction opposite the first direction at the interface with adjacent or abutting components.

In view thereof, modified and/or alternate configurations of the embodiments described herein may become apparent or obvious to one of ordinary skill. All such variations are considered as being within the metes and bounds of the instant disclosure. For instance, while reference may have been made to particular feature(s) and/or function(s), the disclosure is considered to also encompass any and all equivalents providing functionalities similar to those disclosed herein with reference to the accompanying drawings. Accordingly, the spirit, scope and intent of the instant disclosure is to embrace all such variations. Consequently, the metes and bounds of the instant disclosure are defined by the appended claims and any and all equivalents thereof.

What is claimed is:

1. A winch, comprising:

a bearing housing;

a one way bearing disposed within the bearing housing, the one way bearing comprising:

an inner ring; and an outer ring attached to the bearing housing;

a bearing hub comprising:

a cylindrical section, wherein at least a portion of the cylindrical section is disposed within and attached to the inner ring of the one way bearing; and a disk;

a friction disk comprising opposing first and second surfaces, wherein the first surface is adjacent the disk of the bearing hub;

a crank spool comprising opposing first and second disks, wherein the first disk is adjacent the second surface of the friction disk;

a crank housing configured for rotatably retaining the crank spool;

a crank shaft extending through the bearing hub, through the friction disk, and into the crank spool, wherein a first end of the crank shaft is coupled to the crank spool;

a crank mechanism coupled to a second end of the crank shaft; and a knob secured to the crank spool configured to prevent the crank spool from rotating to decouple the crank mechanism from the crank shaft.

2. The winch of claim 1, wherein when the crank mechanism is rotated in a first direction, the bearing hub, the friction disk and the crank spool are longitudinally displaced towards one another to form substantially frictionless interfaces between the bearing hub and the friction disk, and between the friction disk and the crank spool.

3. The winch of claim 2, comprising a strap comprising:

a first end attached to the crank spool; and a second end configured for attachment to a load.

4. The winch of claim 3, wherein continued rotation of the crank mechanism in the first direction winds the strap onto the crank spool and the strap is subjected to tension by the load.

5. The winch of claim 4, wherein the one way bearing inhibits the strap from unwinding when the crank mechanism is released while the strap is under tension.

6. The winch of claim 4, wherein when the crank mechanism is rotated in a second direction opposite the first direction, the bearing hub, the friction disk and the crank spool are longitudinally displaced apart and the strap unwinds from the crank spool.

7. The winch of claim 6, wherein the one way bearing inhibits the strap from unwinding when the crank mechanism is released while the strap is under tension.

8. The winch of claim 2, wherein the crank spool is configured for being held stationary when the crank mechanism is rotated in a second direction opposite the first direction.

9. The winch of claim 8, wherein the crank mechanism is rotatable in the second direction to substantially reduce friction between the friction disk and the crank spool.

10. The winch of claim 9, wherein rotation of the crank spool is not hindered by the one way bearing.

11. The winch of claim 1, wherein the crank mechanism comprises:

a handle mount;

a crank handle; and a handle lock/release lever.

12. The winch of claim 11, wherein the handle mount is attached to the second end of the crank shaft; and the crank handle is attached to the handle mount.

13. The winch of claim 11, wherein the crank handle is removable.

14. The winch of claim 11, wherein the handle mount and the crank handle are integrally formed.

15. The winch of claim 11, wherein the crank handle comprises threads.

16. The winch of claim 1, wherein the crank spool and the crank shaft are integrally formed.

17. The winch of claim 1, comprising:

a first crank bearing disposed between the first disk of the crank spool and the crank housing; and a second crank bearing disposed between the second disk of the crank spool and the crank housing.

18. A winch, comprising:

a bearing housing;

a one way bearing disposed within the bearing housing, the one way bearing comprising:

an inner ring; and an outer ring coupled to the bearing housing;

a bearing hub comprising:

a cylindrical section, wherein at least a portion of the cylindrical section is disposed within and coupled to the inner ring of the one way bearing; and a disk;

a crank spool comprising opposing first and second disks, wherein the first disk is adjacent the disk of the bearing hub;

a crank housing configured for rotatably retaining the crank spool;

a crank shaft extending through the bearing hub and into the crank spool, wherein a first end of the crank shaft is coupled to the crank spool;

a crank handle coupled to a second end of the crank shaft; and a knob secured to the crank spool configured to prevent the crank spool from rotating.

19. The winch of claim 18, wherein when the crank handle is rotated in a first direction, the bearing hub and the crank spool are longitudinally displaced towards each other to form a substantially frictionless interface therebetween.

20. The winch of claim 19, comprising a strap comprising:

a first end attached to the crank spool; and a second end attached to a load.

21. The winch of claim 20, wherein continued rotation of the crank handle in the first direction winds the strap onto the crank spool and subjects the strap to tension by the load.

22. The winch of claim 21, wherein the one way bearing inhibits the strap from unwinding when the crank handle is released.

23. The winch of claim 21, wherein when the crank handle is rotated in a second direction opposite the first direction, the bearing hub and the crank spool are longitudinally displaced apart and the strap unwinds from the crank spool.

24. The winch of claim 19, wherein the crank spool is configured for being held stationary when the crank handle is rotated in a second direction opposite the first direction.

25. The winch of claim 24, wherein the crank handle is rotatable in the second direction to substantially reduce friction between the bearing hub and the crank spool.

26. The winch of claim 25, wherein rotation of the crank spool is not hindered by the one way bearing.

27. The winch of claim 18, wherein the crank handle is removable.

28. The winch of claim 18, wherein the crank spool and the crank shaft are integrally formed.

29. The winch of claim 18, comprising a friction disk disposed between the disk of the bearing hub and the first disk of the crank spool, wherein the disk of the bearing hub, the friction disk and the first disk of the crank spool are configured for minimal slippage therebetween when the crank shaft is rotated in a first direction.

* * * * *